US010290384B2

(12) United States Patent
Campbell et al.

(10) Patent No.: US 10,290,384 B2
(45) Date of Patent: May 14, 2019

(54) ION SPECIFIC MEDIA REMOVAL FROM VESSEL FOR VITRIFICATION

(71) Applicant: Kurion, Inc., Irvine, CA (US)

(72) Inventors: Brett Edward Campbell, Richland, WA (US); Matt Denver Cole, Westminster, CO (US)

(73) Assignee: KURION, INC., Irvine, CA (US)

( * ) Notice: Subject to any disclaimer, the term of this patent is extended or adjusted under 35 U.S.C. 154(b) by 0 days.

(21) Appl. No.: 15/012,101

(22) Filed: Feb. 1, 2016

(65) Prior Publication Data

US 2016/0225475 A1 Aug. 4, 2016

Related U.S. Application Data

(60) Provisional application No. 62/110,563, filed on Feb. 1, 2015.

(51) Int. Cl.
| | | |
|---|---|---|
| *G21F 9/30* | (2006.01) | |
| *B01J 47/016* | (2017.01) | |
| *G21F 9/00* | (2006.01) | |
| *G21F 9/12* | (2006.01) | |
| *G21F 5/005* | (2006.01) | |
| *G21F 5/14* | (2006.01) | |

(52) U.S. Cl.
CPC ............ *G21F 9/305* (2013.01); *B01J 47/016* (2017.01); *G21F 5/005* (2013.01); *G21F 5/14* (2013.01); *G21F 9/008* (2013.01); *G21F 9/12* (2013.01)

(58) Field of Classification Search
None
See application file for complete search history.

(56) References Cited

U.S. PATENT DOCUMENTS

| | | | |
|---|---|---|---|
| 3,640,888 A | 2/1972 | Baybarz | |
| 3,773,177 A * | 11/1973 | Queiser | G21F 9/06 210/770 |
| 4,058,227 A | 11/1977 | Shakshober | |
| 4,678,493 A * | 7/1987 | Roberts | A62D 3/40 501/155 |
| 5,267,280 A * | 11/1993 | Duquesne | G21F 9/28 210/682 |
| 5,368,652 A * | 11/1994 | Mullinax | B08B 9/0821 134/22.18 |
| 5,368,852 A * | 11/1994 | Umemoto | A61K 9/0095 424/78.1 |
| 5,424,042 A * | 6/1995 | Mason | G21F 9/008 422/159 |
| 5,643,350 A * | 7/1997 | Mason | C03B 3/00 588/900 |
| 5,678,237 A * | 10/1997 | Powell | C03B 5/005 219/660 |
| 6,204,427 B1 * | 3/2001 | Eddy | F23G 5/085 110/346 |
| 6,283,908 B1 | 9/2001 | Powell et al. | |
| 6,326,563 B1 | 12/2001 | Cicero-Herman | |
| 6,558,308 B2 | 5/2003 | Powell et al. | |
| 6,941,878 B2 | 9/2005 | Powell et al. | |
| 7,211,038 B2 | 5/2007 | Thompson et al. | |
| 7,429,239 B2 | 9/2008 | Thompson et al. | |
| 2014/0066685 A1 * | 3/2014 | Kato | G21F 5/005 588/16 |
| 2014/0356270 A1 | 12/2014 | Shmayda et al. | |
| 2015/0368136 A1 | 12/2015 | Raymont et al. | |

FOREIGN PATENT DOCUMENTS

| | | | |
|---|---|---|---|
| CN | 101486036 | * | 7/2009 |
| JP | 01245199 | * | 3/1988 |
| JP | 01245199 | * | 9/1989 |
| JP | H01 245199 A | | 9/1989 |
| JP | 2009061377 | * | 9/2007 |
| JP | 4421642 | * | 2/2010 |
| KR | 20030035015 | * | 5/2003 |
| KR | 101173832 | * | 8/2012 |

OTHER PUBLICATIONS

European Patent Office, "International Search Report and Written Opinion of the International Searching Authority" for PCT Application No. PCT/US2016/015937, dated May 2, 2016, 12 pages.
European Patent Office, "International Preliminary Report on Patentability of the International Searching Authority" for PCT Application No. PCT/US2014/072224, dated Aug. 10, 2017, 7 pages.

\* cited by examiner

*Primary Examiner* — Sheng H Davis
(74) *Attorney, Agent, or Firm* — Scwabe Williamson & Wyatt

(57) ABSTRACT

Disclosed herein are systems, methods, processes, and apparatuses for treating radioactive waste, through systems designed to bind and dry radioactive media and to mechanical devices and techniques that are utilized for removal of granular media from confined spaces (vessels and tanks). In some of its various embodiments, the system processes spent ion exchange media for long-term storage.

17 Claims, 20 Drawing Sheets

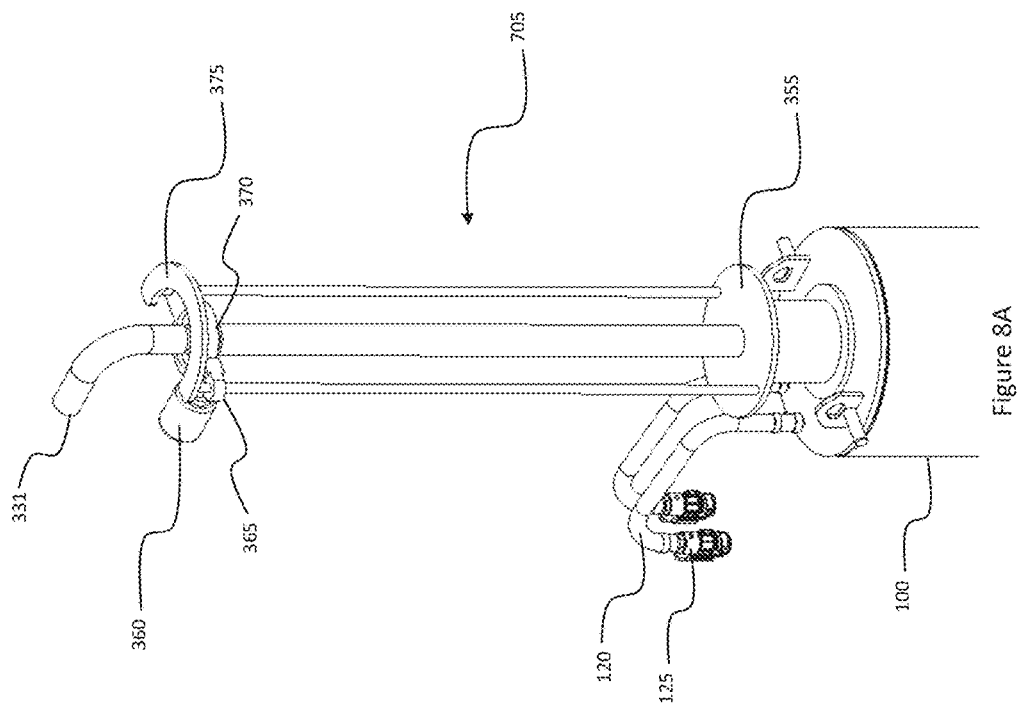

ION SPECIFIC MEDIA REMOVAL FROM VESSEL FOR VITRIFICATION

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots, and data as described below and in the drawings hereto and All Rights Reserved.

TECHNICAL FIELD

In an embodiment, this disclosure relates generally to methods and apparatus for nuclear waste remediation and to mechanical devices and techniques that are utilized for removal of granular media from confined spaces (vessels and tanks).

BACKGROUND

The ability to isolate and manage specific radioactive ions is necessary for clean, safe, and secure radioactive waste management, which in turn is essential for the safe and cost-effective use of nuclear power. There exist numerous ion exchange waste water treatment systems in operation. Each of these systems comprise ion exchange (IX) vessels containing a specific media that is utilized to perform ion exchange with incoming waste water. Over time, the IX resin or media become loaded with captured ions and can no longer capture additional ions, therefore no longer treating the incoming waste water. Some systems, such as water softening systems, and some contaminated water treatment systems, regenerate the media within the vessels by washing in some manner to renew the media and allow it to capture additional ions. Some systems, especially those capturing radionuclides or other hazardous chemicals, are not regenerated and the radionuclides or contamination stays on the media within the vessel becoming a storage and disposal issue as the number of vessels accumulates.

To reduce the complexity and length of the Detailed Specification. Applicant(s) herein expressly incorporate(s) by reference all of the following materials identified in each numbered paragraph below. The incorporated materials are not necessarily "prior art" and Applicant(s) expressly reserve(s) the right to swear behind any of the incorporated materials.

Advanced Tritium System and Advanced Permeation System for Separation of Tritium from Radioactive Wastes and Reactor Water in Light Water Systems, Ser. No. 62/239,660 filed Oct. 9, 2015, which is herein incorporated by reference in its entirety.

GeoMelt Electrode Seal, Ser. No. 62/272,604 filed Dec. 29, 2015, which is herein incorporated by reference in its entirety.

Mobile Processing System for Hazardous and Radioactive Isotope Removal, Ser. No. 14/748,535 filed Jun. 24, 2015, with a priority date of Jun. 24, 2014, which is herein incorporated by reference in its entirety.

Balanced Closed Loop Continuous Extraction Process for Hydrogen Isotopes, Ser. No. 14/294,033, filed Jun. 2, 2014, with a priority date of May 31, 2013, which is herein incorporated by reference in its entirety.

Methods for Melting of Materials to be Treated, U.S. Pat. No. 7,211,038 filed Mar. 25, 2001, with a priority date of Sep. 25, 2001, which is herein incorporated by reference in its entirety.

Methods for Melting of Materials to be Treated, U.S. Pat. No. 7,429,239 filed Apr. 27, 2007, with a priority date of Sep. 25, 2001, which is herein incorporated by reference in its entirety.

In-Situ Vitrification of Waste Materials, U.S. Pat. No. 5,678,237 filed Jun. 24, 1996, with a priority date of Jun. 24, 1996, which is herein incorporated by reference in its entirety.

Vitrification of Waste with Continuous Filling and Sequential Melting, U.S. Pat. No. 6,283,908 filed May 4, 2000, with a priority date of May 4, 2000, which is herein incorporated by reference in its entirety.

AVS Melting Process, U.S. Pat. No. 6,558,308 filed Apr. 25, 2002, with a priority date of May 7, 2001, which is herein incorporated by reference in its entirety.

Advanced Vitrification System 2, U.S. Pat. No. 6,941,878 filed Sep. 26, 2003, with a priority date of Sep. 27, 2002, which is herein incorporated by reference in its entirety.

Applicant(s) believe(s) that the material incorporated above is "non-essential" in accordance with 37 CFR 1.57, because it is referred to for purposes of indicating the background or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

Aspects and applications presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the systems, methods, processes, and/or apparatuses disclosed herein. To the contrary, if the provisions of 35 U.S.C. § 112, ¶6 are sought to be invoked to define the embodiments, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ", if the claims also recite any structure, material or acts in support of that means or step, or that perform the recited function, then it is the clear intention of the inventors not to invoke the provisions of 35 U.S.C. § 112, ¶ 6. Moreover, even if the provisions of 35 U.S.C. § 112, ¶6 are invoked to define the claimed embodiments, it is intended that the embodiments not be limited only to the specific structure, material or acts that are described in the preferred embodiments, but in addition, include any and all structures, materials or acts that perform the claimed function as described in alternative embodiments or forms, or that are well known present or later-developed, equivalent structures, material or acts for performing the claimed function.

BRIEF DESCRIPTION OF THE DRAWINGS

A more complete understanding of the systems, methods, processes, and/or apparatuses disclosed herein may be derived by referring to the detailed description when considered in connection with the following illustrative figures. In the figures, like-reference numbers refer to like-elements or acts throughout the figures. The presently preferred embodiments are illustrated in the accompanying drawings, in which:

FIG. 8A depicts a vacuum tool attached to the top of an ISM vessel.

Figure 1:
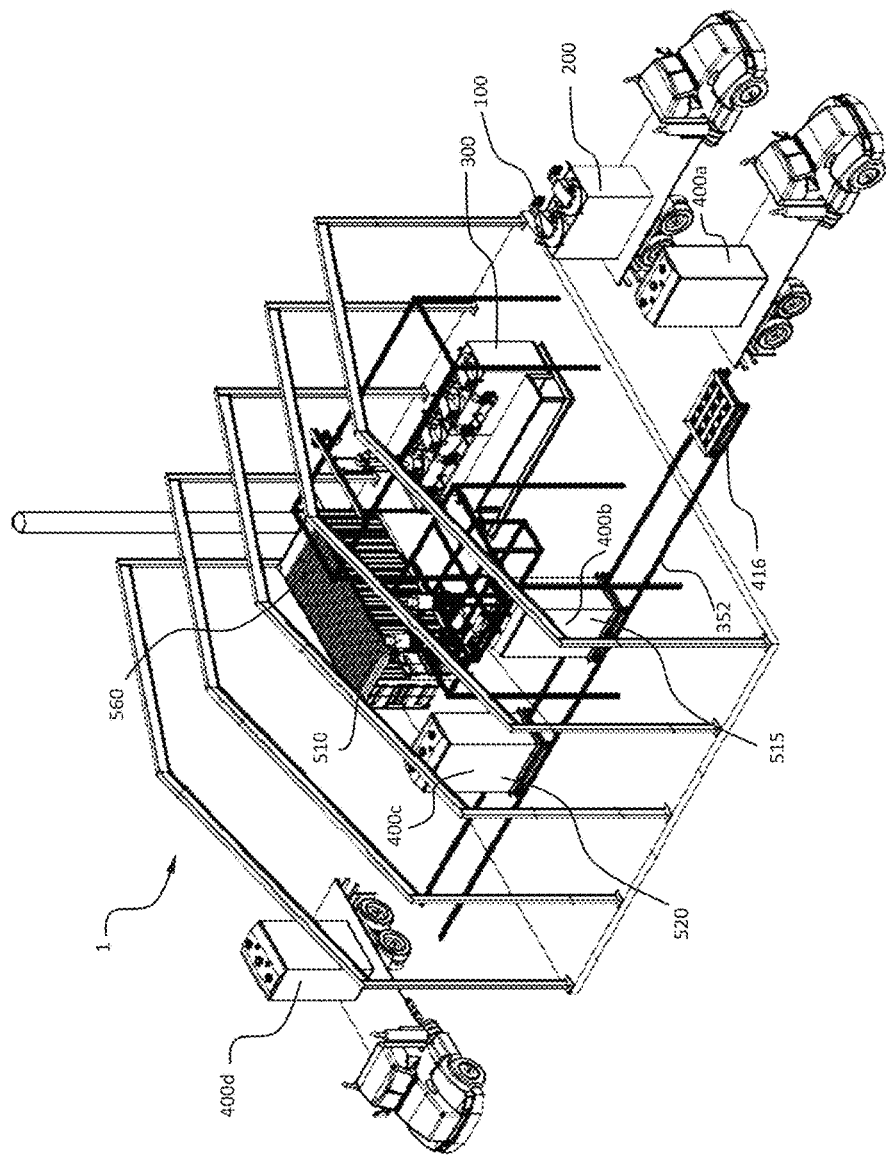
FIG. 1 is an isometric view of an ICV (In-Container Vitrification) treatment facility.

Elements and acts in the figures are illustrated for simplicity and have not necessarily been rendered according to any particular sequence or embodiment.

DETAILED DESCRIPTION

In the following description, and for the purposes of explanation, numerous specific details, process durations, and/or specific formula values are set forth in order to provide a thorough understanding of the various aspects of exemplary embodiments. It will be understood, however, by those skilled in the relevant arts, that the apparatus, systems, and methods herein may be practiced without these specific details, process durations, and/or specific formula values. It is to be understood that other embodiments may be utilized and structural and functional changes may be made without departing from the scope of the apparatus, systems, and methods herein. In other instances, known structures and devices are shown or discussed more generally in order to avoid obscuring the exemplary embodiments. In many cases, a description of the operation is sufficient to enable one to implement the various forms, particularly when the operation is to be implemented in software. It should be noted that there are many different and alternative configurations, devices, and technologies to which the disclosed embodiments may be applied. The full scope of the embodiments is not limited to the examples that are described below.

In the following examples of the illustrated embodiments, references are made to the accompanying drawings which form a part hereof, and in which is shown by way of illustration various embodiments in which the systems, methods, processes, and/or apparatuses disclosed herein may be practiced. It is to be understood that other embodiments may be utilized and structural and functional changes may be made without departing from the scope.

Ion Exchange Water Extraction

Presented herein in an embodiment is an approach for integrating a vacuum drying system in combination with a pneumatic removal system to remove dry granular ion exchange (IX) media from spent ion exchange vessels for additional contaminated waste stabilization. The approach is automated and can be operated remotely to enhance worker safety. The approach may both prepare and retrieve spent IX media for additional final stabilization processes such as vitrification.

The gold standard for long-term disposal waste form is glass due to the very low leachability of the contamination out of the glass. As such the systems and methods disclosed herein prepare the spent ion exchange (IX) media and vessel for long-term disposal in a vitrified waste form that reduces both volume as well as dose considerations due to the self-shielding of the glass material. The approach further has utility for de-watering and removal of moist granular media from any confined vessel or tank. The approach removes excess water and dries the spent ion exchange media while still within the containment vessel and then, with the same equipment, pneumatically extract the dry media for further long-term stabilization such as vitrification. As such, the following patents are herein incorporated by reference in their entirety; U.S. Pat. No. 7,211,038 B2, U.S. Pat. No. 7,429,239 B2, U.S. Pat. No. 5,678,237, U.S. Pat. No. 6,283,908, U.S. Pat. No. 6,558,308 B2, and U.S. Pat. No. 6,941,878 B2.

In this concept, spent ion exchange (IX) media is removed from the current storage vessels and fed into either an In-Container Vitrification (ICV™) container or a Mobile Vitrification System (MVS™) where it is then converted to a very durable vitrified waste form. The treatment container for this concept may also serve as the storage container. In some embodiments the contents of four ISM vessels may be processed in each ICV container. A total of four completed ICV containers may fit into one of the existing Interim Storage Facility culverts such that the equivalent media of sixteen ISM vessels may be contained in each culvert, in some embodiments. Other embodiments may contain more or less media depending on conditions such as culvert size, storage container size, location size, amount of media to be contained, etc.

Disclosed herein is an approach to accommodate existing equipment and facilities while also adhering to a site dose objective of 1 mSv/hr or less on contact. In the SI system of units, a millisievert (mSv) is defined as "the average accumulated background radiation dose to an individual for 1 year, exclusive of radon, in the United States." 1 mSv is the dose produced by exposure to 1 milligray (mG) of radiation.

The following benefits will provide a cost-effective and safe approach to treat spent (contaminated) IX resin or media, while providing both near and long-term benefits:

Volume Reduction—Vitrification can provide substantial volume reduction of waste materials compared to the currently untreated waste inventory;

Site Dose Reduction—The dense and concentrated glass waste form provides self-shielding and supports more efficient use of shielding, allowing for significantly more radioactive material to be stored in each existing Interim Storage Facility culverts without exceeding a 1 mSv/hr or less on contact site objective;

Superior Waste Form—The vitrified product is a stable final waste form that is superior in leach resistance and durability over grout and other alternatives. The described approach meets or exceeds established waste form standards for radioactive waste in most countries. The final waste package conforms to current design of onsite storage requirements while also being capable for transport offsite if a future need arises;

Cost Savings—Lifecycle cost savings are achieved due to reduced requirements for intermediate storage capacity, no monitoring of waste packages (hydrogen venting, etc.), and no further waste stabilization because the vitrified product should satisfy any final waste disposal criteria; and Broad Applicability—Vitrification is highly appropriate for spent IX (ion exchange) media, resins, sludges, as well as having applicability for other waste streams, such as fuel debris and decommissioning waste. The same equipment can treat these wastes with only minimal modifications to the process.

In an embodiment, the systems and methods disclosed provide safe handling of radioactive and hydrogen-generating waste materials while protecting the workers and the environment from the incumbent radiological hazards; and produce a high-quality waste form in compliance with current and future onsite storage requirements (mitigates the need for future retreatment). The ICV process may be successfully deployed in a facility that is contact operated and maintained and may not require heavily shielded hot cell capability.

System and Process Overview

For proper explanations of the systems and methods disclosed herein, it may be necessary to describe some embodiments by referencing multiple figures in the same paragraph. Figures are mentioned accordingly.

FIG. 1 depicts an embodiment of an ICV Treatment Facility 1 (also referred to herein as GeoMelt Treatment Facility 1. For embodiments of this disclosure, the term GeoMelt describes a process based on the principle of vitrification, the process by which a vitrified product with embedded contaminates is formed). The depicted ICV Treatment Facility 1 comprises an ICV processing area 515. IX media handling system 510, ICV cooling 520, ISM vessel processing 300, and an off-gas treatment system 560. Spent ISM vessels 100 are transported from storage for processing. In some embodiments, the ISM vessels 100 are transported in localized shielded containment 200. The ISM vessels 100 are transferred into the ISM vessel processing area 300 where they are prepared for IX media removal.

Empty ICV containers 400a are transported from storage or a vessel preparation area. In some embodiments the ICV containers 400a will be placed on a transfer system 416 which may include rails 352 for simple transport through the ICV Treatment Facility 1. The IX media is removed from the ISM vessels 100 and transferred into an IX handling system 510 where the IX media may be combined with additives to increase efficiency of vitrification. The IX media, which in some embodiments is mixed with one or more additives, will then be transferred to an empty ICV container 400b. The IX media may then be vitrified in the container 400b. As vitrification is being carried out, the volume of material within the ICV container 400b will decrease so IX media may be added throughout the process until the ICV container 400b is full.

In the ICV processing area 515, the filled ICV containers 400c are transferred to ICV cooling area 520 and cooled prior to transfer to storage. Cooled ICV containers 400d are transferred to storage at the completion of processing. Throughout the various processes in the ICV Treatment Facility 1 off-gases may be transferred and treated by an off-gas treatment system 560.

Waste handling and processing operations may be mobile or conducted at permanent installations such as pre-engineered metal buildings. FIG. 1 depicts an embodiment of the processing operations in a pre-engineered metal building. In the depicted embodiment, the building provides weather protection for the process equipment and basic facility-related functions including utilities, a transfer system 416 to move ICV containers 400a, 400b, 400c, and 400d through the process, receiving and shipping docks, and hoists to handle ISM vessels 100 and supporting maintenance activities.

A central control room (not depicted) may provide for monitoring and control of operations. Alternatively, monitoring and control operations may be performed at a remote location and or may be mobile. Further, monitoring and control operations may be a combination of one or more of on-site, remote, and mobile.

Figure 2:
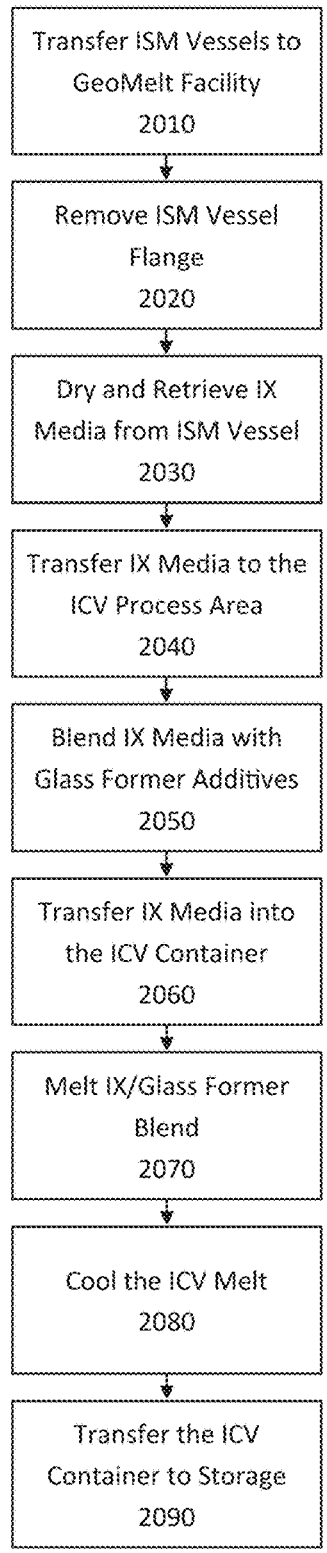
FIG. 2 is a process diagram showing the proposed ICV process for converting spent ISM to stable glass.

FIG. 2 depicts a flow diagram showing an ICV process for converting spent ISM to stable glass using systems such as those depicted in the embodiment of FIG. 1. Steps in the process embodiment depicted in FIG. 2 are generally:

Transfer of the ISM vessels to the treatment facility, step 2010

Remove the vessel flange, step 2020

Dry and retrieve contaminated IX media from the vessel, step 2030

Transfer IX media to the ICV process area, step 2040

Blend IX media with glass former additives, step 2050

Transfer IX media into ICV container, step 2060

Melt IX/glass former blend, step 2070

Cool the ICV melt, step 2080

Transfer the ICV container to storage, step 2090

Additional processes may be included. The processes may be performed in other orders. Each step of the depicted embodiment of the process is described in further detail below.

This concept provides a straightforward and simple approach to converting spent IX media into a high-quality and stable vitrified waste form. The melting of a blend of spent IX media and additives (also referred to herein as "frit", "glass formers", and "glass chemistry modifiers") may take place within an ICV container. In some embodiments, the ICV container is shielded. The ICV container provides a confinement boundary for the process and for the radionuclides in the waste and it provides shielding that mitigates radiation dose rates and reduces the need for the facility to provide additional shielding. In some embodiments, the ISM vessel processing area 300 provides the capability to receive vessels 100 and hold them as they are opened. In some embodiments the ISM processing area 300 receives four vessels at a time, however other amounts are possible. The IX media may be removed and delivered to the ICV container through a pneumatic transfer system. In some embodiments a skid-mounted off-gas system treats gaseous effluents from the ICV operation 515 and IX media vessel process area 300. An ICV container cool-down area 520 is provided to hold containers 400c until they are ready for shipping to an Interim Storage Facility.

Figure 3:
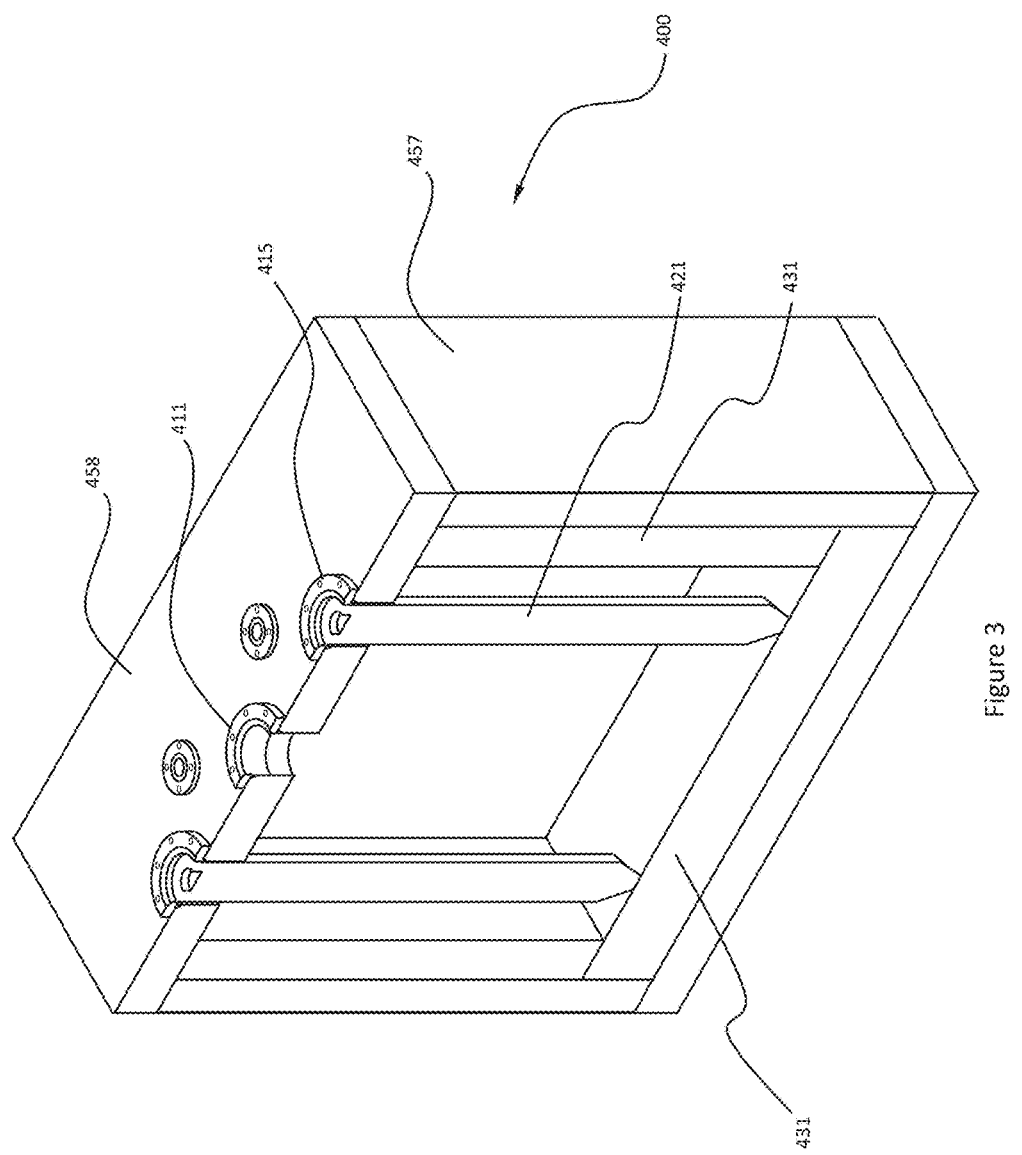
FIG. 3 depicts an example ICV container.
Figure 4:
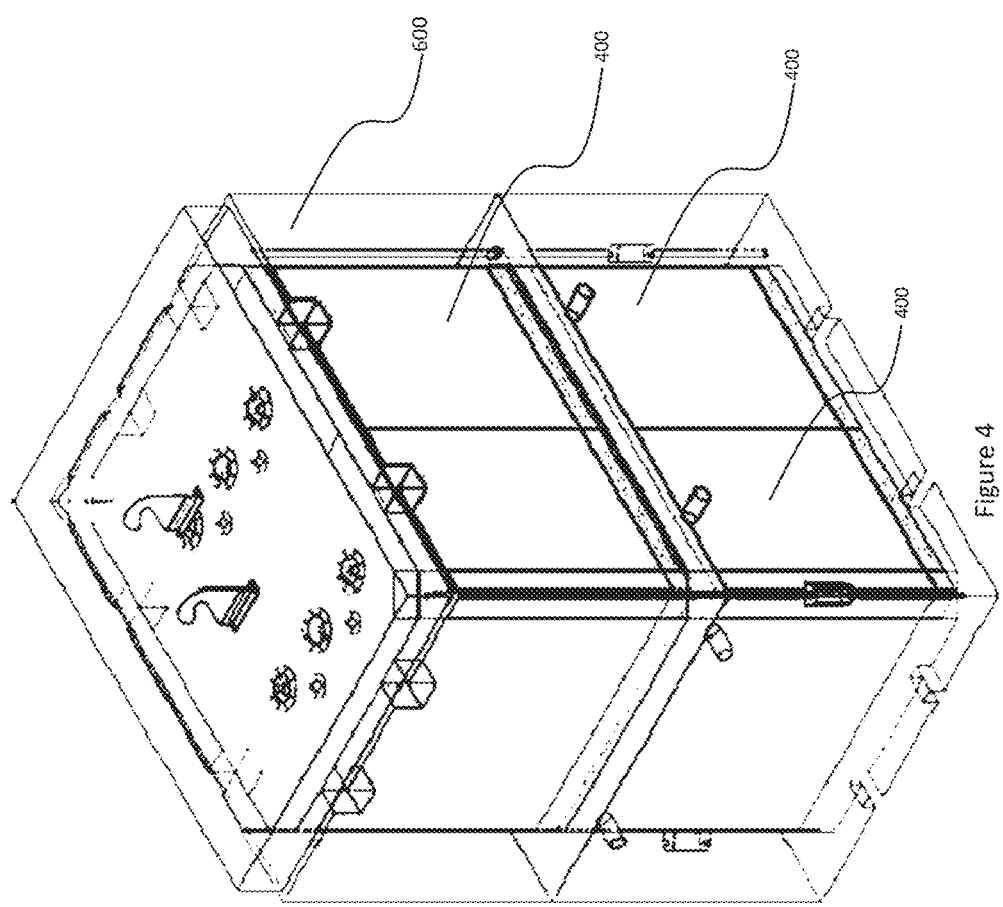
FIG. 4 depicts an example ICV container configuration in an interim storage facility culvert.

FIG. 3 depicts an embodiment of an ICV container 400 comprising outer shielding 457, refractory lining 431, feed port 411, starter path (not shown), electrodes 421, and lid (built in hood) 458 which may be assembled in an ICV container preparation area. In some embodiments the refractory lining 431 may comprise one or more layers of differing materials. In some embodiments the outer shielding 457 is steel. In some embodiments, a starter path, which may comprise a mix of moderately conductive materials (comprising glass frit and graphite flake, in some embodiments) may be installed on top of the base primary refractory layer 431. Electrodes 421 are installed into the starter path and held in position until the ICV container lid 458 is installed. In some embodiments, the electrodes 421 are composed of graphite. In some embodiments the electrodes 421 are 150 mm in diameter. In some embodiments, two or more electrodes 421 may be utilized. One function of the lid 458 (built in hood) is to contain and direct the process off-gas to an off-gas treatment system 560 (FIG. 1). The lid 458 may comprise electrode penetration/seal 415 assemblies that keep the electrodes 421 in contact with the starter path while providing electrical insulation between the electrodes 421 and the ICV container 400. The ICV container 400 in some embodiments may be designed such that four ICV containers 400 may fit in each Interim Storage Facility culvert 600, as depicted in FIG. 4. In some embodiments each ICV container 400 may contain approximately four tonnes of glass.

Process Hazards Analyses may be performed at least once for each facility, regularly, or intermittently to ensure the safety of the process. Areas of focus for the Process Hazards Analyses may comprise retrieval and transfer of the spent ISM, the processing in the ICV container, and the off-gas treatment. The following factors relate to increasing the safety of the process:

Dose from the vitrified ICV container 400 will preferably be no greater than current doses from the shielded ISM vessels as currently managed in interim storage.

The site dose objective may be less than 1 mSv/hr.

Transfer of the ISM may use vacuum and/or gravity systems, thus eliminating hazards from pressurized systems.

The size of the ICV containers 400 may be selected to stay within the interim storage crane capacity to eliminate or reduce drop hazards.

A control strategy similar to those previously identified may be applied and can be expected to provide protection to workers, the public, and the environment.

Established off-gas technology may be applied.

In further discussion of FIG. 1, typical storage facilities use 30 tonne bridge cranes for retrieval of ISM vessel assemblies (including the shield) 100 by essentially performing the installation procedure steps in reverse order to remove and place an ISM vessel 100 onto a vehicle for transportation to the GeoMelt Treatment Facility 1. ISM vessel assemblies 100 are ISM vessels 100 that include a shield. ISM assemblies 100 are also referred to herein as shielded ISM vessels 100 and ISM vessels 100. In some embodiments, the GeoMelt Treatment Facility 1 will be capable of handling two or more ISM vessels 100 at the same time. The retrieval of the ISM vessels 100 one at a time versus two or more at the same time will depend on the transportation shield 200, the processing capabilities, and transportation capabilities. Spent strontium (Sr) ISM vessels 100 in some embodiments may be retrieved one at a time in order to use an existing transportation cradle, in some embodiments. Use of an existing transportation shield 200 may provide stability for the ISM vessel 100 during transport. In some embodiments, ISM vessel 100 preparation may be performed at an Interim Storage Facility to take advantage of the concrete culvert shielding.

In some embodiments, one or more of the processes described herein may be mobile and or modular such as those described in Mobile Processing System for Hazardous and Radioactive Isotope Removal, Ser. No. 14/748,535 filed Jun. 24, 2015, with a priority date of Jun. 24, 2014, which is herein incorporated by reference in its entirety.

ISM Vessel Processing Station

Figure 5:
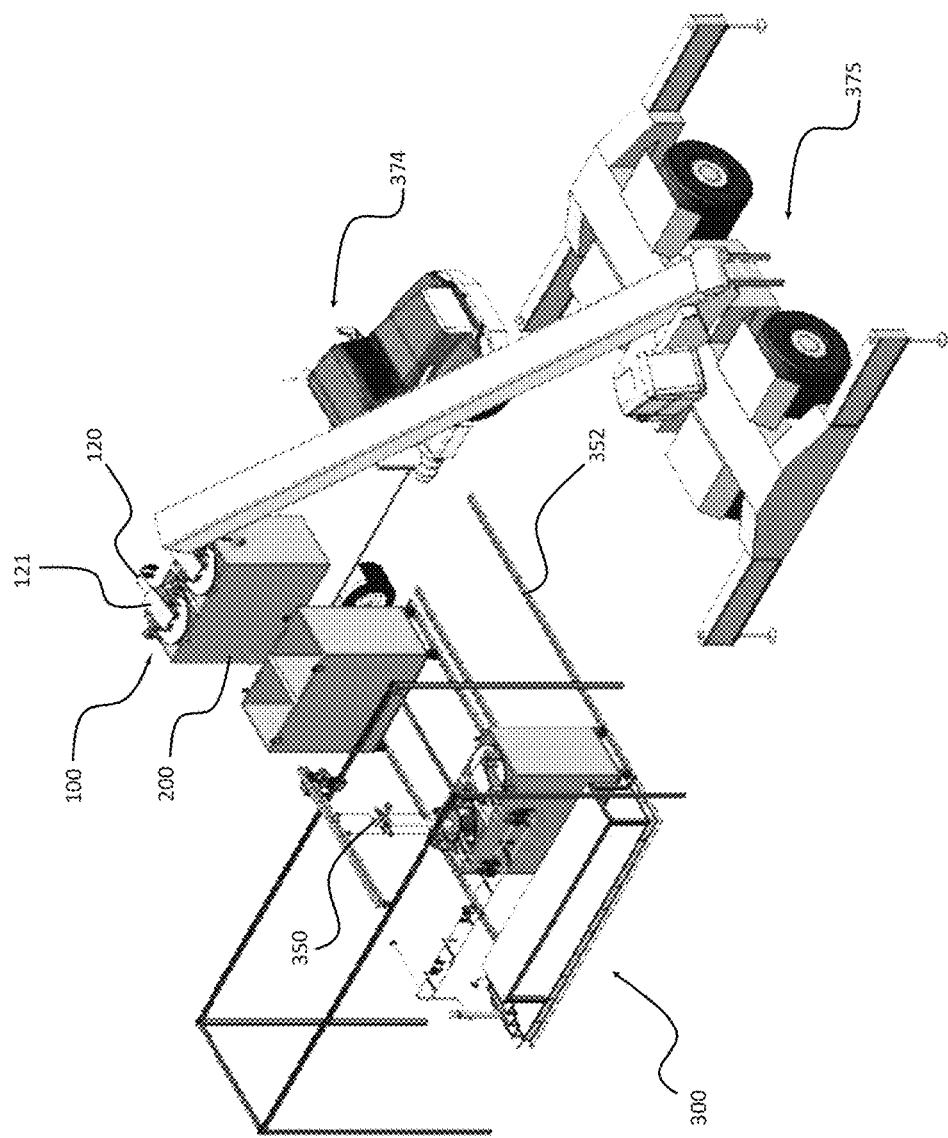
FIG. 5 is an isometric view of an ISM (Ion Specific Media) vessel processing station.

Referring to FIG. 5 (proper explanation is aided by also referring to FIG. 1 as noted) spent ISM vessels and/or assemblies (which include a shield) 100 may be retrieved from a culvert and placed into a transportation unit 374. The ISM vessels 100 may then be transported to the ICV Treatment Facility 1 (often referred to herein as GeoMelt Facility) (FIG. 1). At the ICV Treatment Facility 1 (FIG. 1) a mobile overhead crane, and/or lifting devices, 375 may be used to remove the ISM vessels and/or assemblies (ISM vessels) 100 and place them into an ISM vessel processing station 300. The depicted ISM vessel processing station 300 has localized shielded containment 200 with space to handle four ISM vessel assemblies 100 at the same time. In some embodiments, the localized shielded containment 200 may be sized for different numbers of ISM vessels 100.

In some embodiments the crane or other lifting device 375 may place the one or more ISM vessels 100 into stations on rails 352 to convey them into the ICV Treatment Facility 1 (FIG. 1) ISM vessel processing station 300 for subsequent processing. Hoses 120 may be connected to an air manifold 350 for drying similar to the Dewatering Station currently used for ISM vessels 100. For shielded ISM vessels 100, the shield lid may be removed to allow access to the top of the ISM vessel 100. Spent ISM vessels 100 may have different designs depending on company of manufacture, date of manufacture, and other variables. As such, the processing station 300 may utilize a flexible design to handle multiple vessel configurations in the bays and/or expand to have additional bays or end effectors specific to different vessels.

Remote Cutting and Removal of Flange

Referring now to FIGS. 6A through 6D (proper explanation is aided by also referring to FIG. 5 and FIG. 1 as noted), the shield lid 121 (FIG. 5) may be removed to provide access to the top of the ISM vessel 100. In some embodiments a bridge crane, or other lifting device, located in the GeoMelt Treatment Facility 1 (FIG. 1) is used to remove the shield lid 121 (FIG. 5). With the top of the ISM vessel 100 exposed, it may be necessary to cut the pressure relief piping 116 connected to the top of the central flange 150. In some embodiments, like that depicted in FIG. 6A, this will be done using a shearing tool 140 that may be hung from a load balancing tool holder. The shearing tool 140 may be manipulated with either long reach tools or Master-Slave Manipulators (MSMs). Two cuts may be required to remove this small bore piping 116. Shearing may provide improved control over the cut and present reduced risks. Other methods from those described herein also may be utilized to remove the small bore piping 116 such as waterjet cutting and saw cutting methods. After the small bore piping 116 on the flange 150 has been removed, a tool for removal of the central flange 150 can be installed. In the depicted embodiment of FIG. 6B, the cutting tool is a waterjet 160. Other cutting methods are contemplated. The tool 160 may be deployed from an overhead mount (not depicted) which lowers the tool 160 over the flange 150.

Figure 6A:
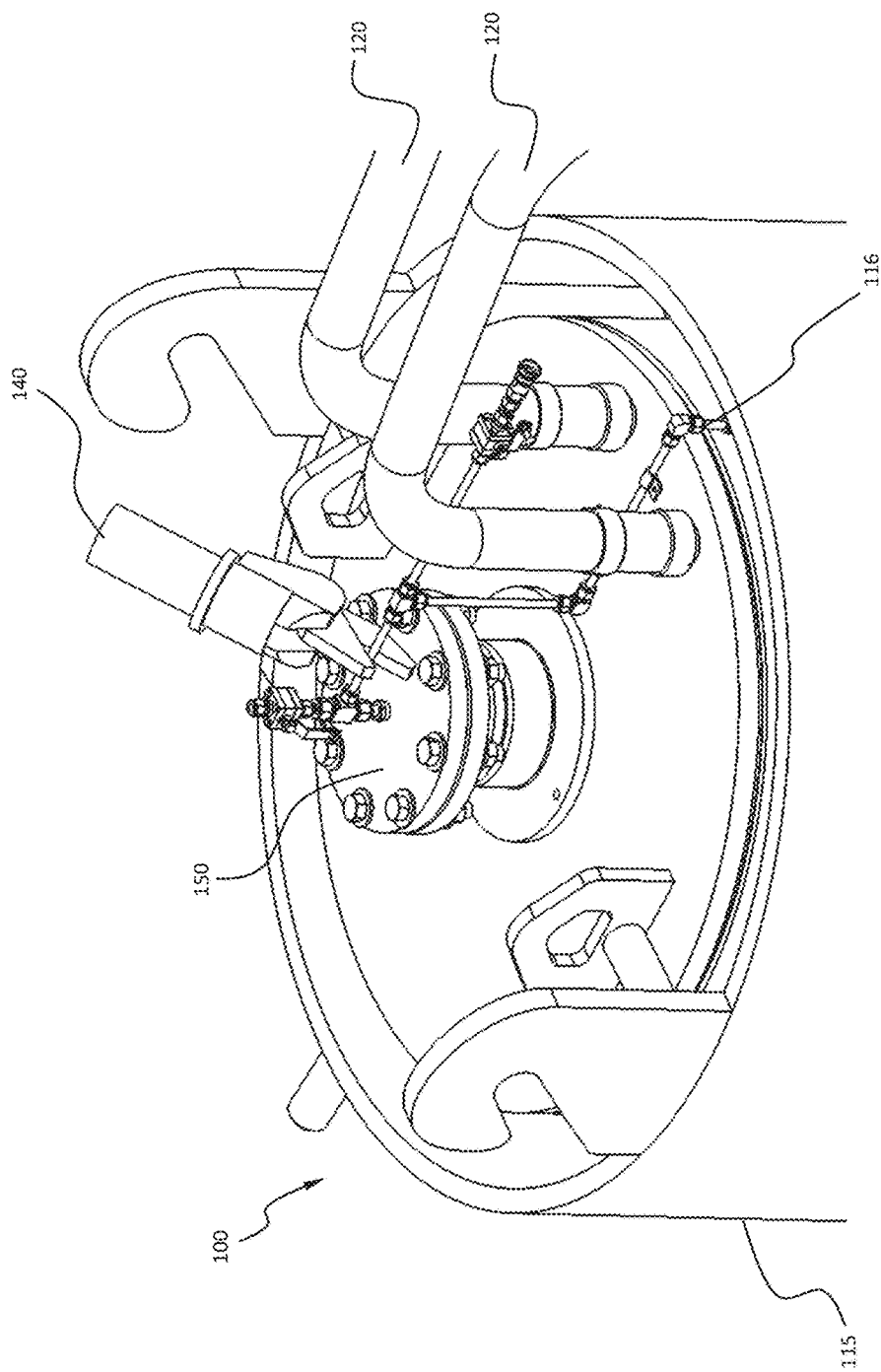
FIG. 6A depicts shearing of small bore pressure relief piping from the top of the central flange on the ISM vessel.
Figure 6B:
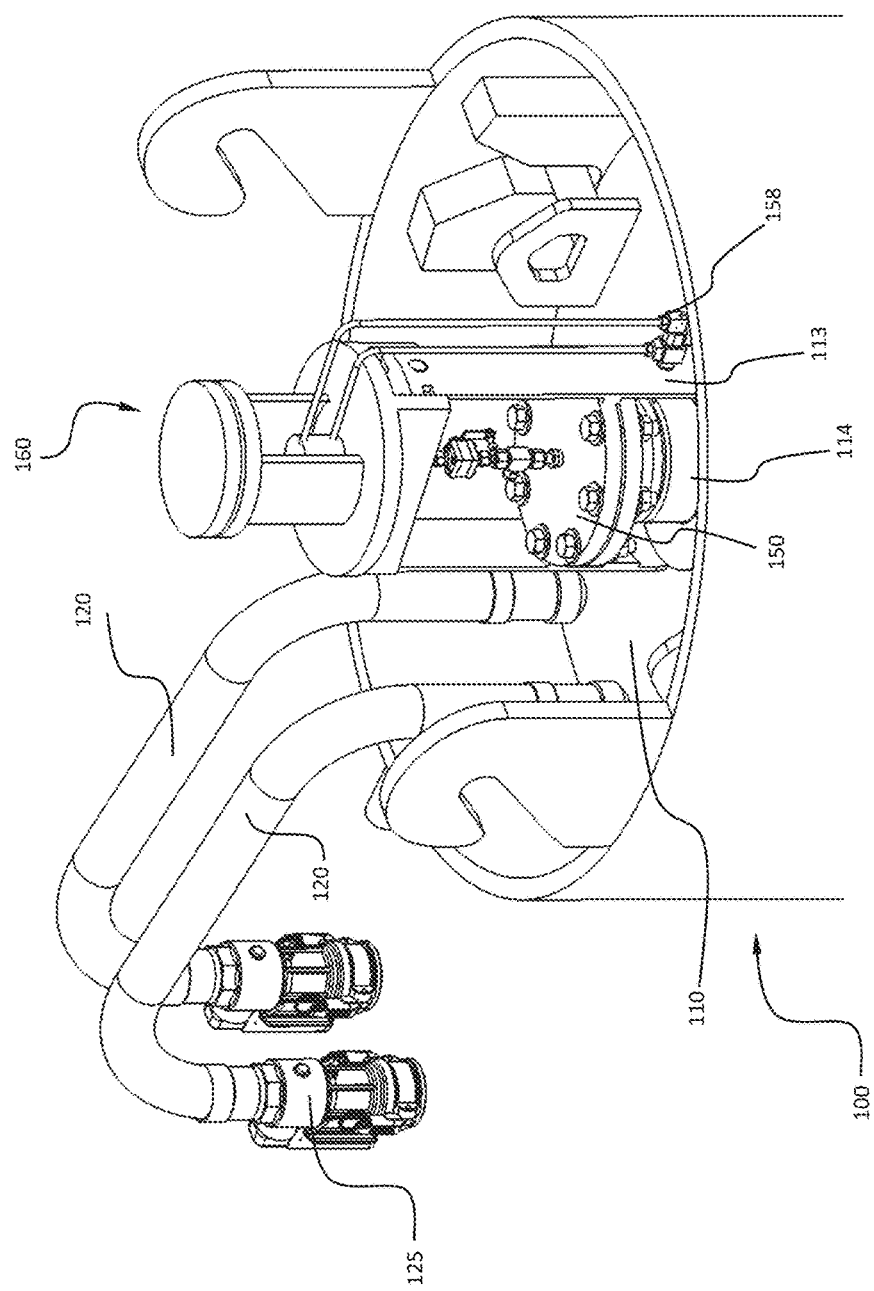
FIG. 6B depicts a waterjet tool installed over the central flange of the ISM vessel.
Figure 6C:
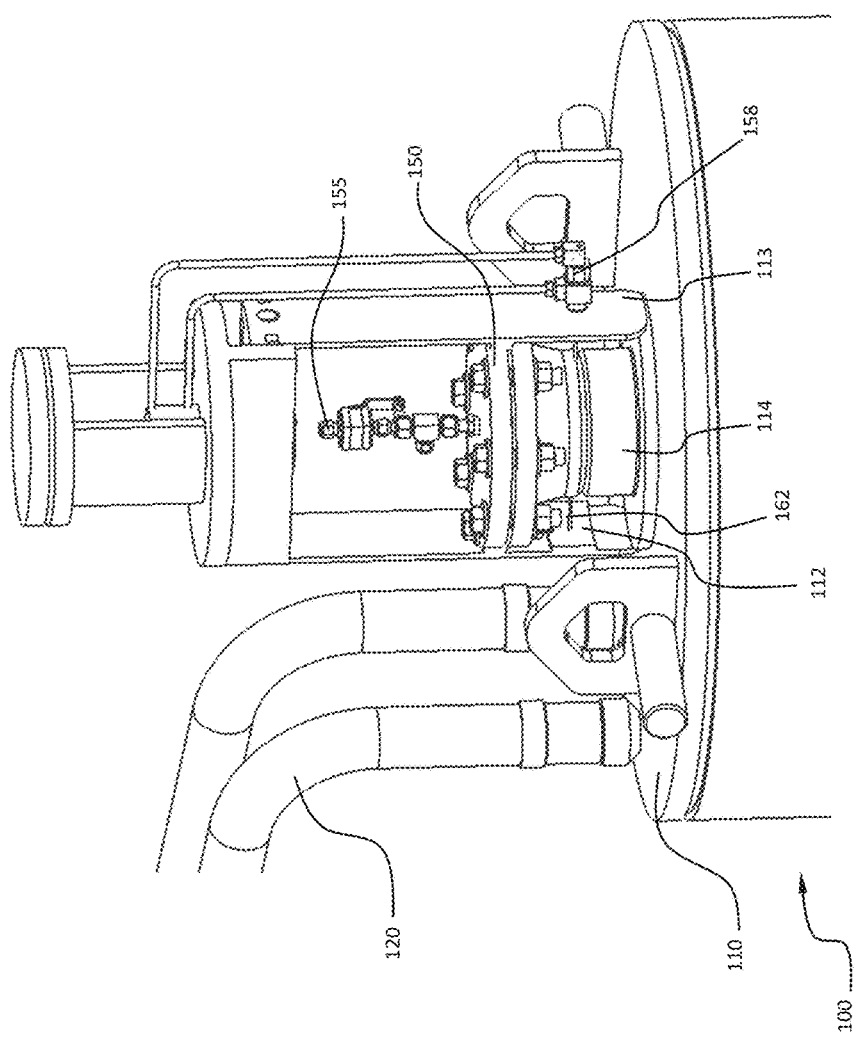
FIG. 6C depicts a waterjet tool during central flange cutting.
Figure 6D:
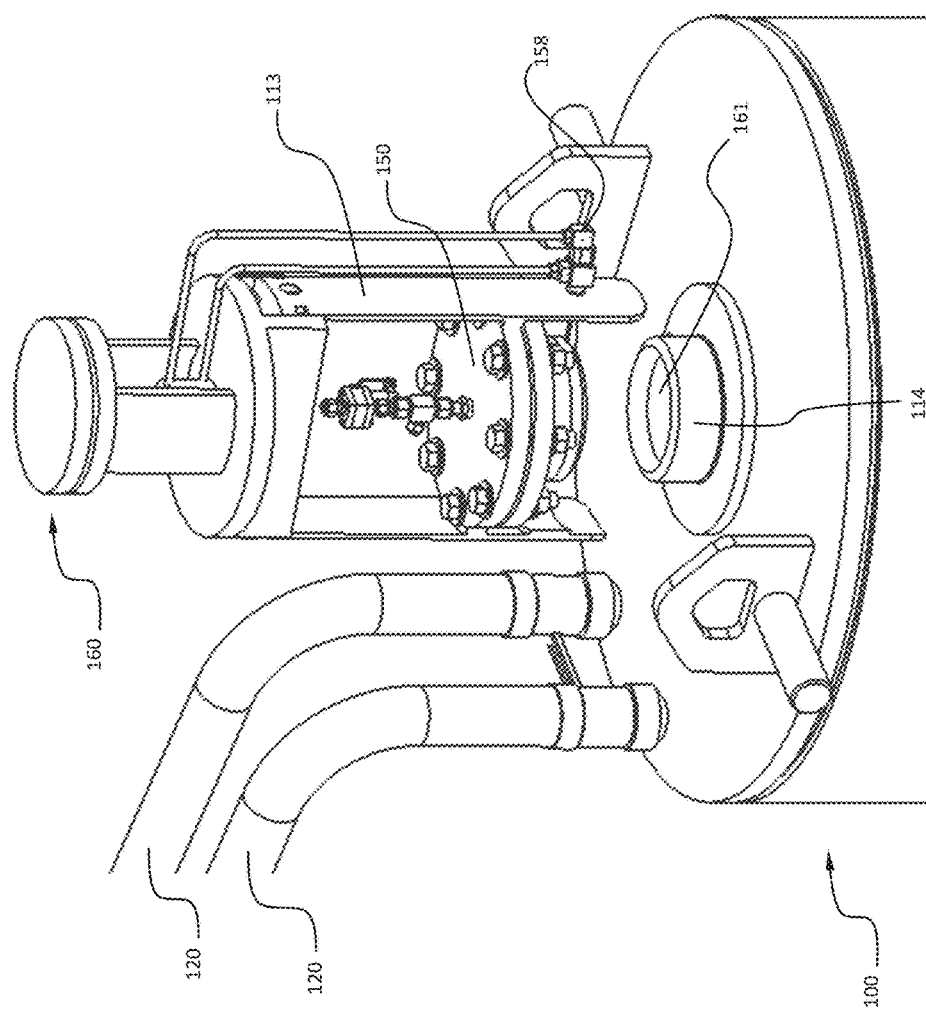
FIG. 6D depicts a waterjet tool removing the cut central flange from the ISM vessel.

Using waterjet cutting system 160, depicted in FIGS. 6B through 6D, a pressurized mixture 162 (typically water and garnet) may be used to "cut" the top ISM vessel flange 150. The cutting tool 160 has a waterjet head 158 on one leg of a clamp mechanism 113. In the depicted embodiment, the entire tool 160 rotates during cutting to separate the stub pipe 114 below the flange 150. The clamp 113 opposite the waterjet cutter 160 may comprise a plate 112, composed of tungsten carbide in some embodiments, which is capable of dispersing any remaining water 162 which exits the cut. This plate 112 serves to prevent accidental cutting of other parts in the vicinity. The majority of the limited quantity of water will typically be collected in the ISM vessel shield annular space which is the area between the ISM vessel 100 and the shield 115. Some water may enter the ISM vessel 100. During cutting, a small suction may be applied to the inside of the ISM vessel 100 to ensure that once the ISM vessel 100 is breached any airflow will be into the ISM vessel 100 and no contamination will escape.

This concept presented here is detailed graphically for a specific ISM vessel 100 type; the same basic approach with slightly modified tooling could be used for other ISM vessel 100 types and sizes.

Clamp 113 may secure the tool 160 during cutting. Once the cut is complete, the clamp 113 may further grip the flange 150 and remove it, as depicted in FIG. 6D. In some embodiments the flange 150 may be retrieved using a tool that may be separate or included as part of the waterjet cutting system 160. Once the flange 150 is removed, a temporary cover may be placed over the nozzle opening (outlet) 161 for the drying of the spent IX media.

Sampling of Spent Ion Exchange Media Prior to Processing

Figure 7:
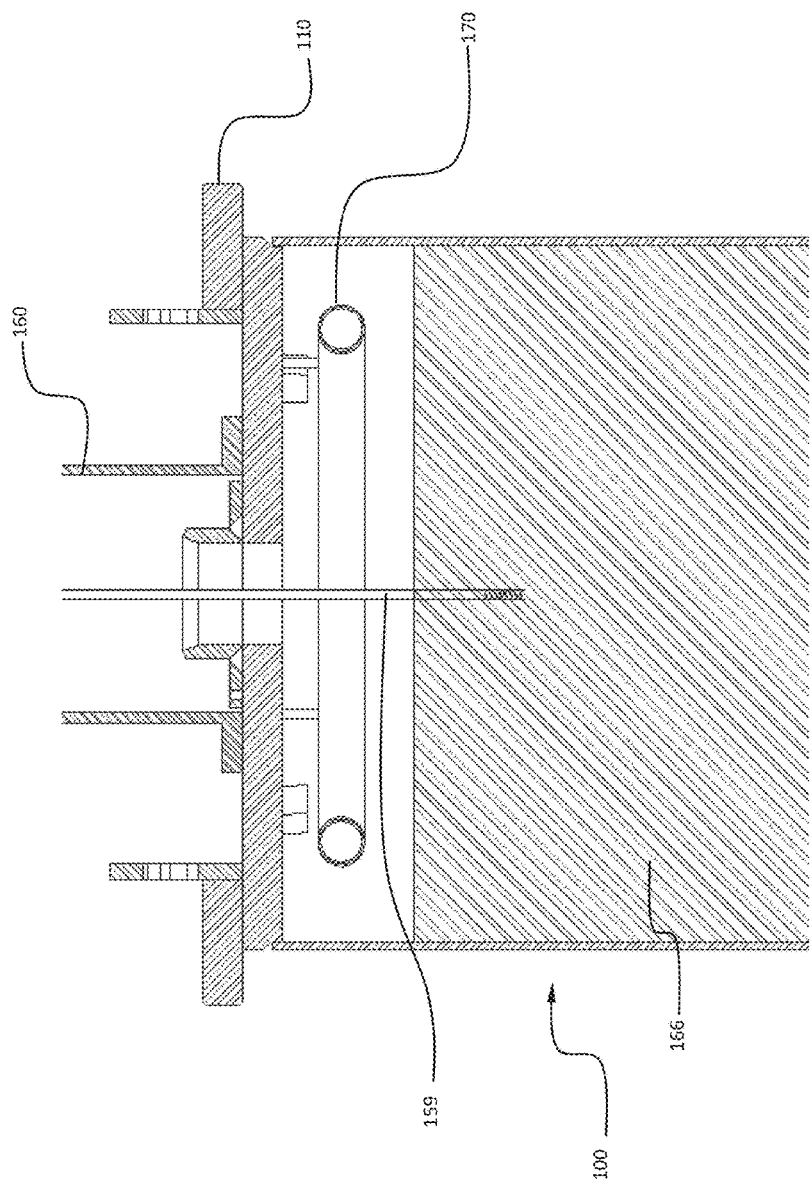
FIG. 7 depicts an example of central core sampling.
Figure 8C:
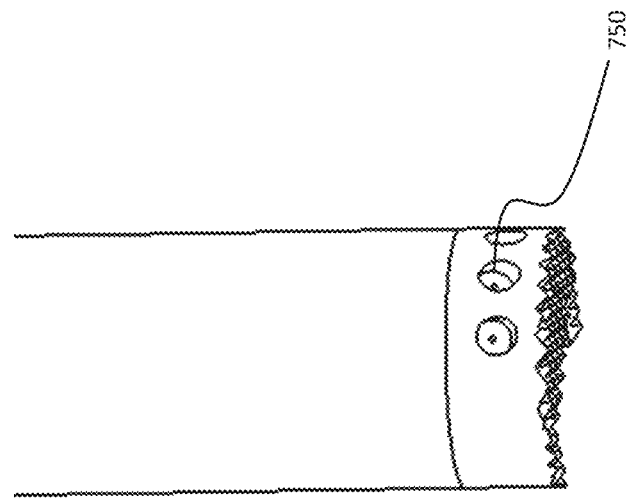
FIG. 8C is a back view showing the details of the suction head of the vacuum tool.
Figure 8B:
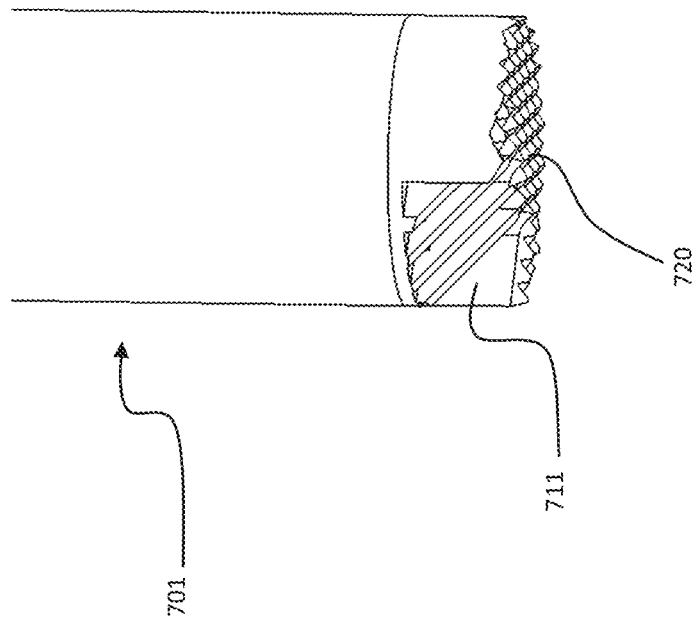
FIG. 8B is a front view showing the details of the suction head of the vacuum tool.

Referring to FIG. 7 (proper explanation is aided by also referring to additional Figures as noted), it may be necessary to collect a physical sample of the IX media 166 prior to retrieval and vitrification. Analysis of the IX media 166 may be needed to confirm previous analytical/dose information and to allow optimization/balancing of container dose loading. A sampling tool 159 may comprise a small bore pipe with an internal auger. The sampling tool 159 may be drilled down the entire height of the ISM vessel 100, if necessary, to retrieve a full vertical profile of the ISM media 166. Sampling tool 159 may be deployed from a top end of ISM vessel 100 similar to the waterjet 160 (FIGS. 6B-6D) or vacuum tool 705 (FIGS. 8A-8C). A sample core may be extracted from inside of the sampling tool 159, placed into a sample transfer tube, and sent for radioassay or other analysis.

Drying of Spent Ion Exchange Media

Once the ISM vessel flange 150 is removed, a temporary cover may be installed over the nozzle opening 161 prior to drying IX media 166. This is done to mitigate potential dusting of dried IX media 166 to the facility 1 (FIG. 1) and to seal the ISM vessel 100 so that heated dried air can be drawn through the ISM vessel 100. Drying of the IX media 166 may be accomplished by drawing under vacuum heated, dry air through the IX bed 166 from the air manifold 350 (FIG. 5). The flow of air is in the direction of normal water flow (i.e., top to bottom). At the outlet 161 of the ISM vessel 100 the humidity of the air is measured to provide an indication of the presence of free water in the ISM vessel 100. If free water is present it is anticipated to be near the bottom of the ISM vessel 100. The outlet of the ISM vessel 100 may be equipped with a humidity probe. The dryness of the IX Media 166 may be determined by comparing the inlet air and outlet air humidity values. The IX Media 166 will be determined to be dry when these values are equal. Other methods may be used to determine the moisture content of the IX media.

Retrieval of Spent IX Media

When the target dryness is achieved for the spent IX media 166, the temporary cover on the nozzle opening 161 may be removed to allow access to the interior of the ISM vessel 100.

In the embodiment depicted in FIGS. 8A through 8C, retrieval of dried spent IX media 166 is accomplished using pneumatic vacuum system 705, which in some embodiments may be negative pressure. The vacuum retrieval tool 705 may be mounted to the top of the ISM vessel 100. In some embodiments, it may mate and seal to the top surface of the ISM vessel 100. A central vacuum tube in the vacuum tool 705 may then be deployed down into the dried IX media 166. IX Media 166 may be vacuumed by an end effector at the end of a remote manipulator arm and transferred to a receiver unit (not shown) that separates the dried IX media 166 from the air stream using a cyclonic separator or other separation techniques known in the art. The receiver unit may be shielded and sized to limit the amount of material present (to assist in the control of dose and minimize risk from upset conditions). The receiver unit may be equipped with one or more filters that collect dust material prior to discharge of the air to an off-gas treatment system 560 (FIG. 1). In some embodiments the air may be discharged through a blower. Filtration may be accomplished by a filter, a high pressure HEPA filter in some embodiments, which, when spent, is compatible with processing inside an ICV container 400 (FIG. 3).

In the embodiment of FIGS. 8A through 8C, the top of the vacuum tool 705 is a rotary union 375 and vacuum outlet 331. This allows the vacuum tool 705 to rotate without rotating the vacuum outlet 331. Movement is controlled by a rotary drive mechanism 360 which rotates the vacuum tool 705 and a vertical drive mechanism 365 which drives it up and down with a set of screws. Also below the drives is a rotary union 370 for pressured air which feeds the mixing jets 750 (FIG. 8B).

The end of the vacuum tool 705 in the depicted embodiment is a suction head 701. The suction inlets 711 are placed on one side of the suction head 701 and on the other side are pressurized air jets 750. In some embodiments there are three pressurized air jets 750. This allows for material to be drawn into the suction head 701 on one side and blown away on the other. Because the ISM vessel 100 is typically round, this flow of air will circulate the IX media 166 from one side of the ISM vessel 100 to the suction side of the tool 705. The pneumatic jets 750 may also cut and mix the IX media 166. This will move any IX media 166 that is cohered together or outside the range of the vacuum 705. The bottom of the suction head 701 may comprise a grinding plate and cutting edges 720 which mechanically grind any material below the head 701. To fully clean the ISM vessel 100 the suction tube may be rotated slowly and moved down in to the ISM vessel 100 repeatedly. In some embodiments a clear window in the vacuum tool 705 will allow operators to see IX media 166 in the suction flow to determine if the tool position is effective or not. This process will continue downward until all IX media 166 has been removed from the ISM vessel 100.

Figure 9A:
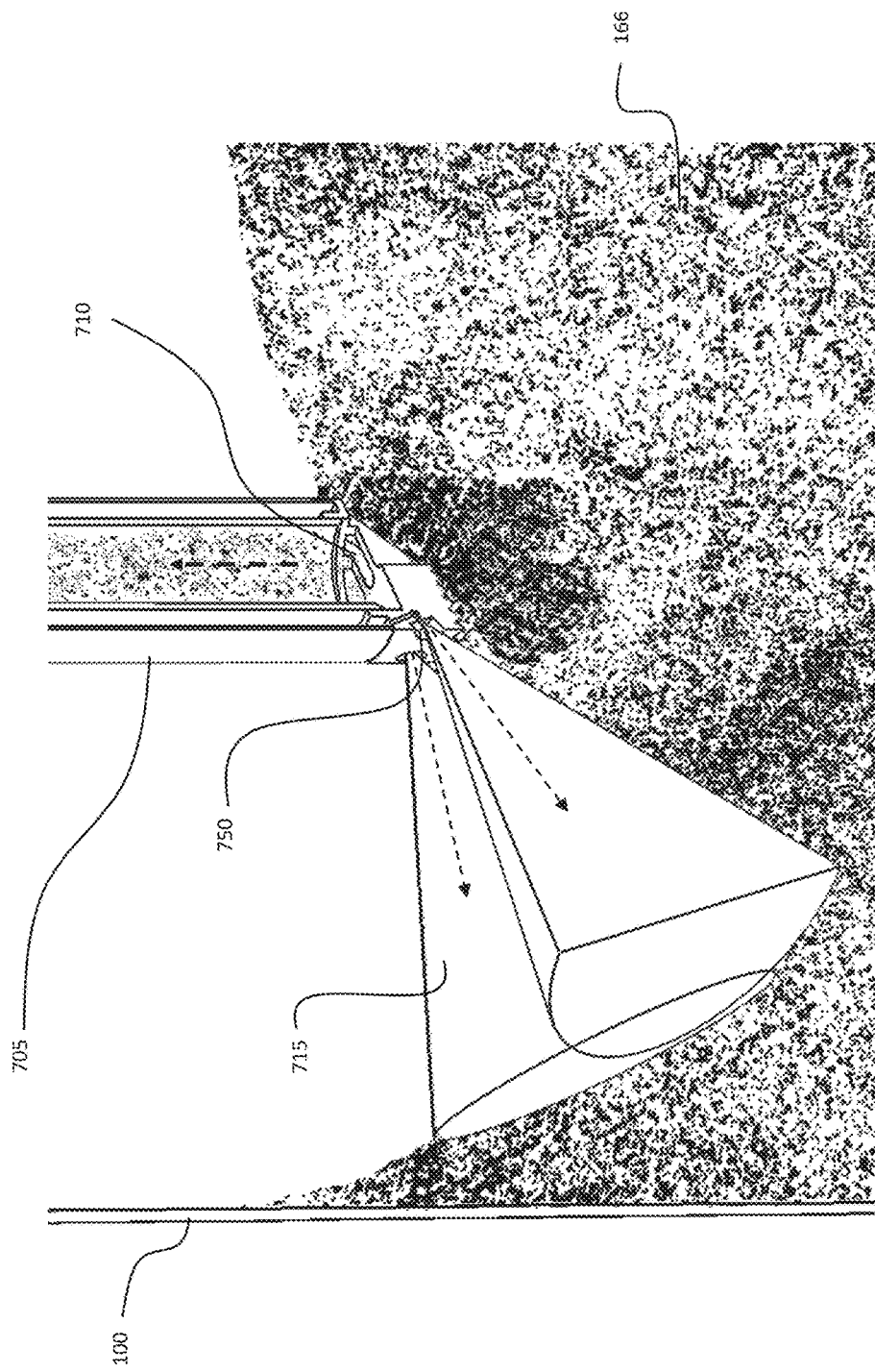
FIG. 9A depicts the suction head and jets removing media from a vessel.
Figure 9B:
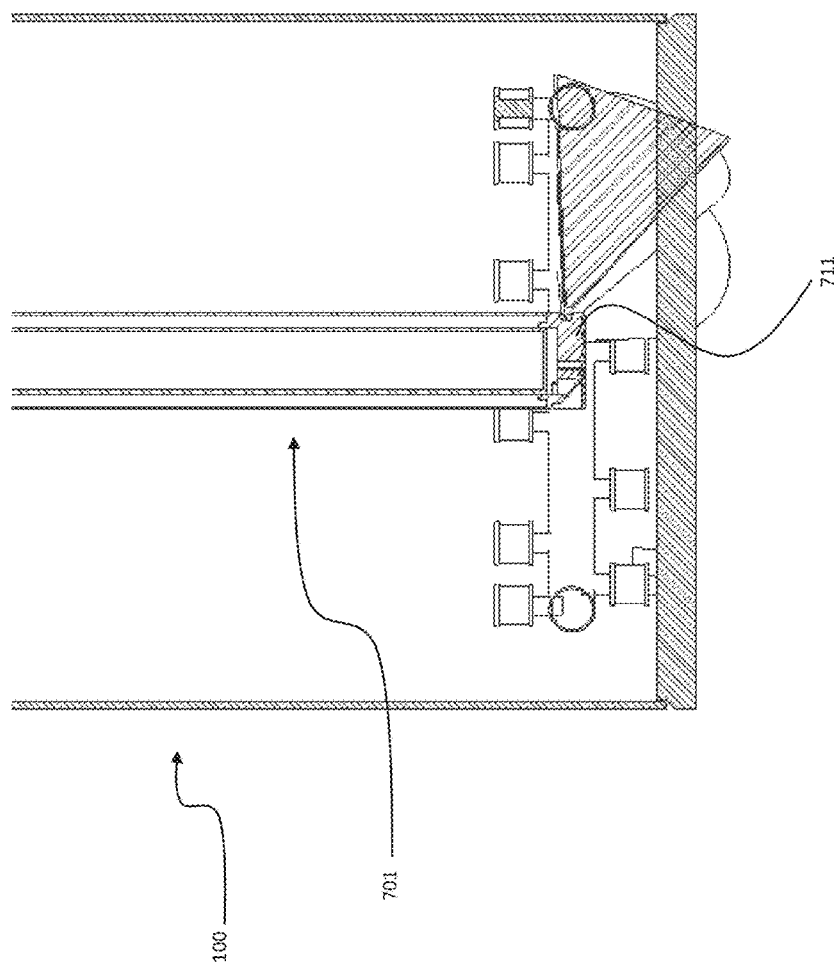
FIG. 9B depicts the suction head and jets removing media from the bottom of a vessel.

FIGS. 9A and 9B depict the vacuum tool 705 in use in an ISM vessel 100. The air jets 750 blow the IX media 166 on one side of the ISM vessel 100 towards the ISM vessel wall where it is deflected toward the other side. A vacuum inlet 711 on the opposite side of the tool 705 pulls in the IX media 166. The emptied ISM vessel 100 will then be free of material with only potential surface contamination present. ISM vessels 100 may be size reduced by crushing or shredding and are assumed to be considered low-level waste. In some embodiments, the ISM vessels 100 may be modified for reuse.

Preemptive testing shows the viability of using a vacuum tool 705 to remove the IX media 166 from the ISM vessels 100. For these tests, two beakers were filled with IX media 166, and soaked in a 2.5% salt solution in water. The saltwater was decanted off after 24 hours and the first beaker was oven dried for 24 hours at 150° C. The second beaker was left out on a benchtop for 48 hours for the purpose of testing wet IX media 166. The compaction of the wet and dry IX media 166 was tested prior to the vacuum test. The contents of each beaker were then vacuumed using a standard shop vacuum. The testing showed that the vacuuming of both the wet and dry IX media 166 was successful; however, the vacuuming of the dried IX media 166 was easier and quicker than vacuuming the wet IX media 166. The testing validated that the IX media 166 could be readily vacuum extracted.

Figure 10:
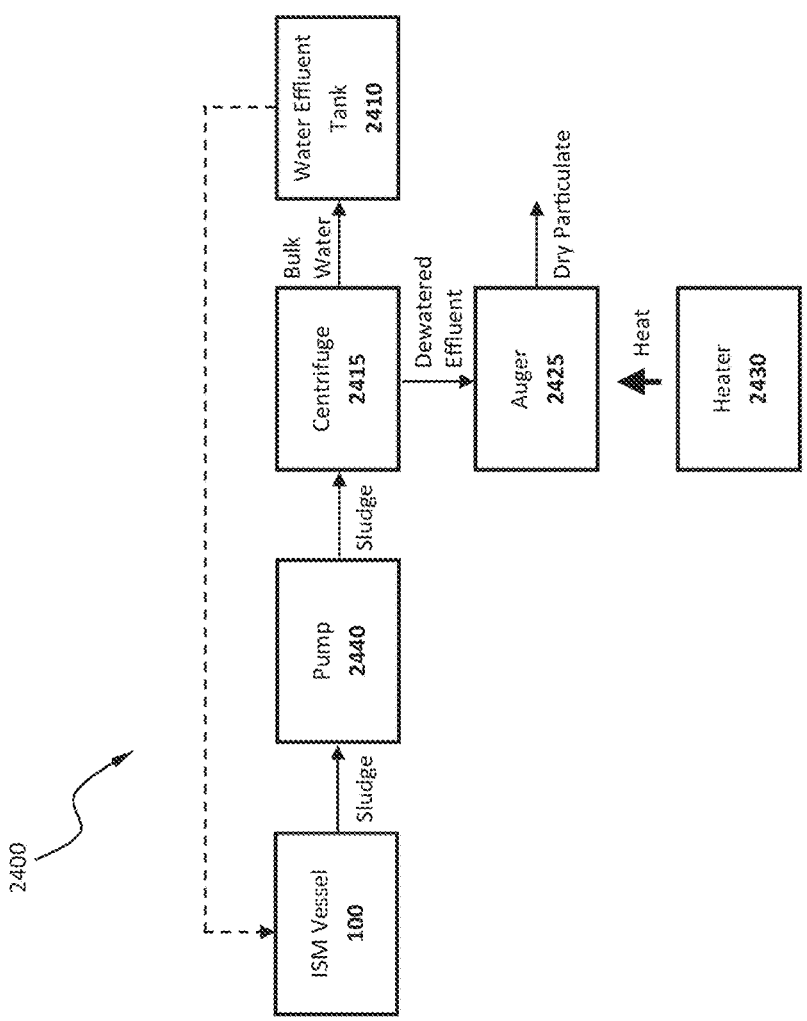
FIG. 10 depicts an embodiment for IX media removal from ISM vessels using a sluicing system.
Figure 11:
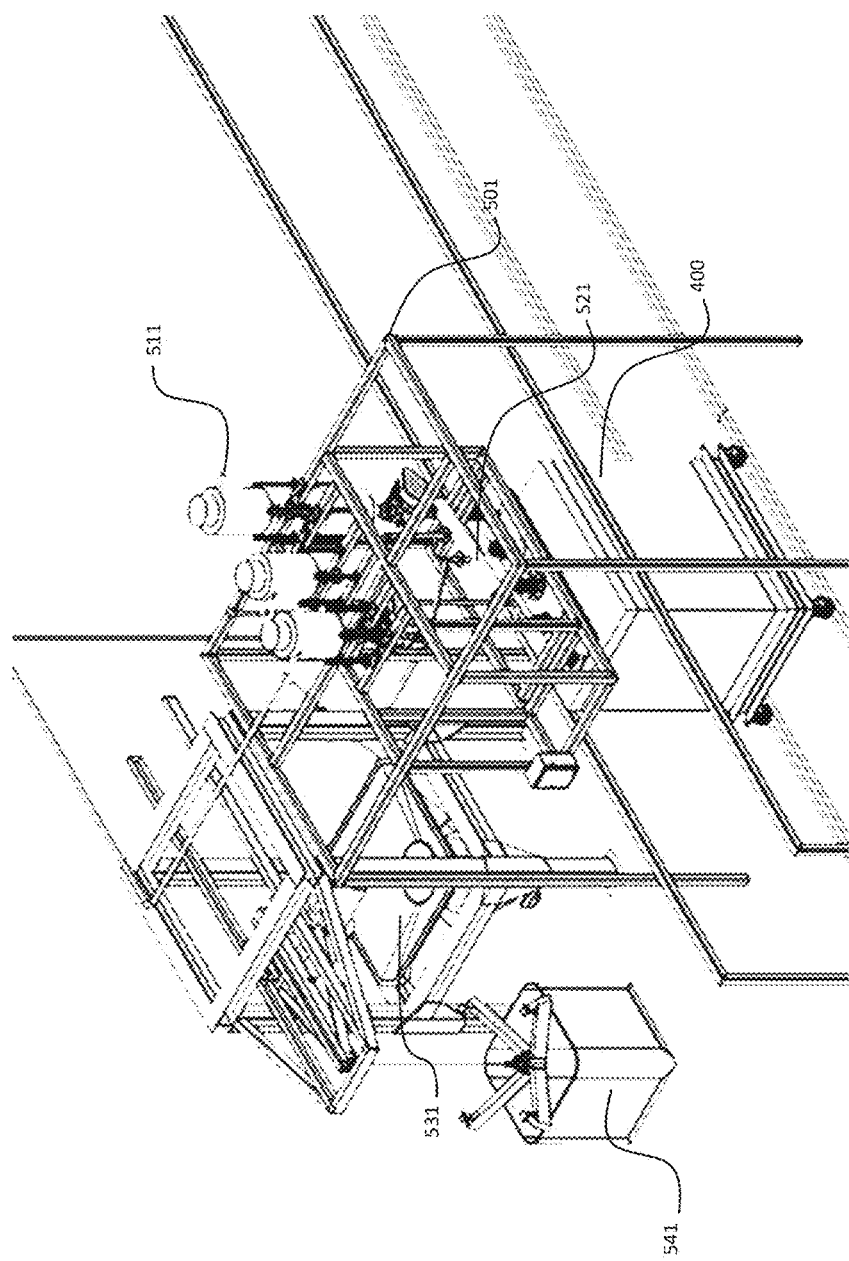
FIG. 11 depicts a pneumatic transfer system, ICV container, and melt area.

Water sluicing technologies also may be used for spent IX media 166 retrieval. An alternate embodiment for IX media removal from ISM vessels 100 is depicted in FIG. 10. In some embodiments a sluice system 2400 may be added to the ICV Treatment Facility 1 (FIG. 1) to retrieve sludge and other wet waste streams from ISM vessels 100. In some embodiments the sluice system 2400 is modular. In some embodiments the sluice system 2400 is mounted on a mobile skid. The ISM vessels 100 may be delivered to the ISM vessel processing station 300 (FIG. 1) which may be comprise a sluice system 2400 including remotely operated sluicing wands (not depicted). The sluice system 2400 may comprise equipment capable of injecting water into ISM vessels 100 containing spent IX media, mixing the water with the spent IX media, and pumping the resulting sludge out of ISM vessels 100. In some embodiments, the water is injected and mixed with the IX media using a sluicing wand. The sludge may be pumped from the ISM vessels 100 using a pump 2440. In some embodiments the sludge is processed in a centrifuge 2415, which may remove bulk water yielding dewatered effluent. The bulk water recovered from the centrifuge 2415 may be recycled through the sluicing wand as needed to assist in sludge removal from ISM vessels 100. Dewatered effluent may feed into an auger 2425 which continues the drying process. In some embodiments the auger 2425 is heated by heater 2430. In some embodiments the auger is hydraulic. The dry particulate exiting the auger 2425 may feed into a hopper 531 (FIG. 11) that has an outlet at the bottom that is capable of coupling with a transfer system 521 (FIG. 11). The off-gas from the sluice system 2400 may be captured and processed by the off-gas treatment system 560 (FIG. 1). In some embodiments, the sluice system 2400 may be deployed as a mobile system to retrieve sludge from the storage tanks and provide a dry material to transport back to the ICV Treatment Facility 1 (FIG. 1).

Referring to the embodiment of FIG. 11, The IX media 166 is transferred vertically above the GeoMelt ICV container 400 by a pneumatic transfer system 521. In some embodiments the pneumatic transfer system 521 is negative pressure. In some embodiments, the hopper 531 size has been minimized (approximately 50 kg) in order to minimize the amount of material at risk. The IX media 166 may be blended with additives and fed into an ICV container 400 by screw feeders, or other feed rate control systems. The pneumatic transfer system 705 (FIGS. 8A-9B) for the IX media 166 is typically separate from the transfer system 521 for the non-contaminated additives for safety reasons.

Preparation of Feed for ICV Container

Spent IX media 166 may be blended with additives (also referred to herein as "frit", "glass formers", and "glass chemistry modifiers") needed to produce a durable, leach-resistant glass waste form capable of meeting or exceeding industry standards. In some embodiments blending may take place in batches as individual ISM vessels 100 are emptied through pneumatic vacuum 705 retrieval. IX media 166 and additives may be blended as dry reagents inside a receiving unit such as an enclosed, shielded hopper. The receiving unit may be sized to be compatible with the ICV processing rate of 150 kg/hr. The receiving unit may be fitted with one or more mixing blades that will blend the dry IX media 166 with additives while preventing caking or buildup in the container.

The blended material may be fed into the ICV container 400 (FIG. 3) to fill it one-third to one-half full. In some embodiments the initial fill level may vary. Electrodes 421 (FIG. 3) are used to conduct electricity for the thermal process, which converts the IX media 166 from a solid to a molten state. In some embodiments, the thermal process is joule-heated. As the blended material is converted to a molten state, the occupied volume within the ICV container 400 (FIG. 3) will decrease as the material being treated densifies. As volume becomes available, additional blended material may be added until the process fills the ICV container 400 (FIG. 3). Inlet air used to cool the process and gases generated from the thermal process may be collected and treated in an off-gas treatment system.

Glass Formulation for Inorganic Media

Several IX media are engineered zeolite-based aluminosilicate materials that will form a glass without additives. However, some additives may be used to maintain the processing temperature at or below 1250° C., in order to minimize Cs volatility. The whole rock oxide analyses of a few selected IX media (KUR-H, KUR-EH, and IONSIV IE-96) are shown in Table 1.

TABLE 1

| Oxide | KUR – H/EH (wt %) | IONSIV IE-96 (wt %) |
|---|---|---|
| $Al_2O_3$ | 13.87 | 17.30 |
| $B_2O_3$ | 0.00 | 0.00 |
| $Bi_2O_3$ | 0.00 | 0.00 |
| CaO | 1.58 | 1.20 |
| $Fe_2O_3$ | 3.44 | 4.00 |
| $K_2O$ | 1.04 | 1.00 |
| $Li_2O$ | 0.00 | 0.00 |
| MgO | 0.75 | 0.80 |
| $Na_2O$ | 5.81 | 7.90 |
| $P_2O_5$ | 0.00 | 0.00 |
| $SiO_2$ | 53.39 | 67.40 |
| $ZrO_2$ | 0.00 | 0.00 |
| BaO | N/A | 0.10 |
| SrO | 0.14 | N/A |
| $TiO_2$ | 0.11 | 0.20 |
| $SO_3$ | 0.85 | N/A |
| LOI | 19.60 | N/A |

As shown in Table 1, above, KUR-H, KUR-EH, and IONSIV IE-96 contain relatively high proportions of the principal glass forming oxides; silica and alumina. While such compositions will make excellent glass, they will result in melt temperatures on the order of 1700 to 1800° C. The processing temperature may be lowered to 1250° C. by the addition of melt temperature and viscosity modifiers; i.e., sodium, calcium, and boron; the corresponding reagents to be added are sodium carbonate ($Na_2CO_3$), calcium carbonate ($CaCO_3$), and boric oxide ($B_2O_3$).

Figure 12:
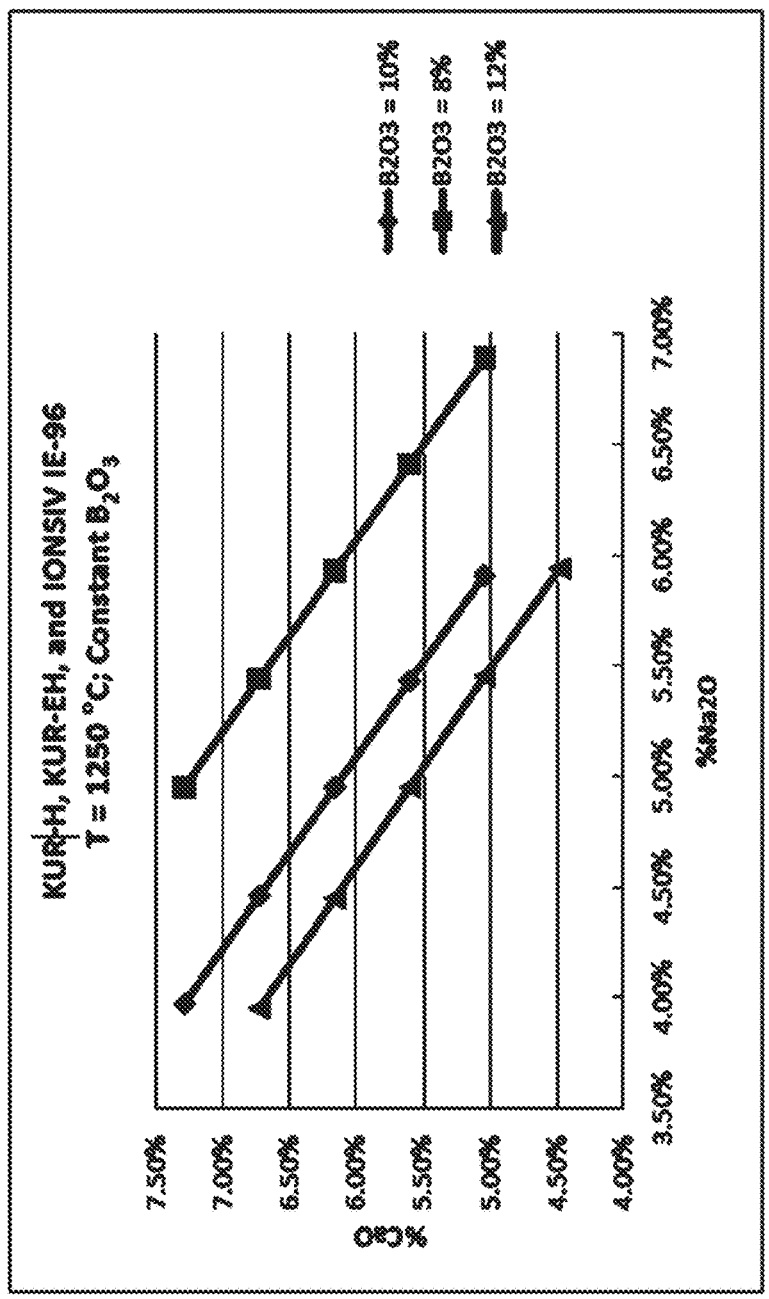
FIG. 12 depicts Kur-H, Kur-EH, and IONSIV IE-96 variograms for Na2O, CaO, and B2O3 at 1200° C.

The compositions given in Table 1 were used in conjunction with fixed values of boric oxide expressed as a weight percentage of the final glass. The amount of CaO and $Na_2O$ were then varied while holding the calculated melt temperature to 1250° C. Curves expressing these calculations are shown in FIG. 12. For these analyses, data runs using 8, 10, and 12 weight percent (wt %) boric oxide ($B_2O_3$) were performed. For each run five different weight percentages of CaO were input and a 1250° C. was solved for by using the Goal Seek feature of Microsoft™ Excel to vary the amount of sodium oxide. From the graphs a continuum reflecting the percentages of CaO and $Na_2O$ for each boric oxide ($B_2O_3$) percentage were obtained.

For the KUR-H and KUR-EH and IONSIV IE-96 ISM the data indicate $Na_2O$ percentages from 5.94% to 3.95% and the corresponding CaO percentages from 4.48% to 6.73%. Given that the KUR-H and Kur-EH IX media contains 5.81% $Na_2O$ and only 1.58% CaO, the lower sodium and higher calcium option was chosen. This translates into the following formulation presented in Table 2, below.

TABLE 2

| Component | Weight % |
|---|---|
| KUR-H and KUR-EH ISM | 70.7% |
| Soda Ash ($NA_2CO_3$) | 9.3% |
| Lime ($CaCO_3$) | 8% |
| Anhydrous Boric Oxide ($B_2O_3$) | 12% |

To prepare the spent IX media as a feed for the ICV container 400, the retrieved dry material may be blended with a glass former mixture tailored for the specific type of IX media 166. Using loss in weight screw feed systems, glass former mixture and IX media 166 may be fed into a screw feeder, or feed rate control system, that provides mixing and conveys the feed to the ICV container 400 as a relatively homogeneous feed stream, as described earlier in this disclosure.

Processing of Organic Wastes

The GeoMelt ICV process may be most efficient when used on inorganic waste matrices. Organic wastes can, however, be accommodated if combined with sufficient quantities of glass forming minerals (GFMs). Note that for optimal processing, the organic content of the resulting mixture should contain no more than 30 wt % organic content in some embodiments.

Spent organic adsorbents stages can be treated in much the same manner. Glass formers can include KUR-H or KUR-EH ISM along with adjunct materials such as boric oxide, soda ash, and lime to act as fluxing agents. The amount of titanium oxide that can be incorporated into the glass may include amounts up to 25 wt %. Similarly, titanium oxide is amenable to the same treatment. This adsorbent is assumed to be titanium dioxide subjected to a surface treatment that optimizes the adsorption of antimony (Sb). A commercial example of the product would be Metsorb® HMRG by Graver Technologies. The surface treatment compounds may not materially affect the gross composition of the resultant glass. Acting on this assumption a glass recipe may be formulated quite easily, provided that the maximum concentration of $TiO_2$ in the resultant glass is stipulated.

Zeolites generally have compositions that result in adequate glasses without amendments. To attain a sufficiently low melting temperature, fluxing agents may be added, as will be done with KUR-H and the other ISMs. Activated carbon can be treated by GeoMelt ICV, but may result in an extremely reducing environment. A source of oxygen may be introduced, either chemically or by bubbling.

GeoMelt ICV can be used for much of the wastes produced in removing harmful radionuclides from the water. Waste treatment strategies may be implemented where some significant synergies exist, since the processing of organic resins or sludges may need blending with quantities of GFMs. For the example above, titanate could be blended with KUR-H. KUREH, or IONSIV-96 to provide the bulk of the required GFMs. The GFMs could be spent inorganic ISM and mixed with other waste streams while ensuring not to exceed established site worker dose objectives. Spent KUR-EH could be used as the GFMs for the titanium and all of the organic streams.

Preparation of ICV Container

ICV container 400 (FIG. 3) preparation comprises of installation of base and side refractory support blocks and panels within a base layer. In some embodiments, the base layer is comprised of silica sand. The base layer provides secondary containment and freezing of any molten material that may migrate from the primary refractory lining (not depicted). The primary refractory lining comprises of larger monolithic precast panels that are installed inside and above a secondary refractory lining 431. The refractory used in some embodiments of the ICV process may be an aluminosilicate clay mineral-based material similar to that widely used in the steel industry for the lining of blast furnaces and can withstand severe high temperature corrosive environments. The design of refractory sand and refractory panels disclosed herein is a scaled-down version of a previously validated design demonstrated for ICV containers 400 holding fifty metric tons of glass. The ICV containers 400 may be prepared in advance of arriving at the site or they may be prepared on-site.

In some embodiments, the refractory lining 431 (FIG. 3) may be approximately 300 mm thick at the base and 200 mm thick on the sides. The refractory base is typically thicker than the refractory sides to reflect the longer exposure on the bottom to the molten glass and to provide structural strength. The ICV container 400 in some embodiments comprises of 6-inch thick carbon steel walls and base, which, with the refractory lining 431 provides appropriate shielding. A stainless steel, or other appropriate shielding material, outer shielding 457 may be implemented to ensure corrosion resistance.

A starter path, which may comprise a mix of moderately conductive glass frit and graphite flake, may be installed on top of the base primary refractory layer 431 in some embodiments. Electrodes 421 are installed into the starter path and held in position until the ICV container lid 458 is installed. In some embodiments, the electrodes 421 are composed of graphite. In some embodiments the electrodes 421 are 150 mm in diameter. In some embodiments, two or more electrodes 421 may be utilized. The lid 458 (built in hood) contains and directs the process off-gas to an off-gas treatment system 560 (FIG. 1). In some embodiments, the lid 458 comprises electrode penetration/seal 415 assemblies that keep the electrodes 421 in contact with the starter path while providing electrical insulation between the electrodes 421 and the ICV container 400.

Processing of Material in ICV Container

The ICV container 400 is designed to receive the waste/glass former mixture, contain the vitrification process, and serves as the final disposal container for the vitrified waste. The ICV container 400 provides primary containment for waste received from the ISM vessels 100, the molten glass during processing, and the final waste product.

The assembled ICV container 400 is moved to the ICV processing area by crane or other lifting/hoisting device. Once in the ICV processing area, the ICV container 400 is connected to the off-gas treatment system 560 (FIG. 1) and to the feed system, through ports in the ICV container lid 458. Instrumentation, such as thermocouples and infrared camera systems, may be connected to the wiring harness, the electrodes 421 are connected to the power system, and the ICV container 400 is grounded to the structural steel that supports the feed system and electrode feeders.

Waste and additives are conveyed into the ICV container 400 by a feed system. The initial batch and subsequent batches are fed to a predetermined level in the ICV container 400 correlated to volumetric discharges and verified by observation, which may comprise at least one infrared camera system in some embodiments.

The waste and additives are melted inside the ICV container 400 using electrical power supplied by the electrodes 421. A starter path may be used to initiate the melt at the base of the first batch feed pile. As melting ensues, the waste mixture densifies creating additional volume in the container allowing for additional waste to be fed and processed. The nominal power level required for processing in some embodiments is approximately 400 kW. The processing rate in some embodiments may be 150 kg/hr.

In some embodiments, each ICV container 400 may hold 4000 kg of glass, based on the volume available inside the refractory lining 431 and the density of glass. Using the glass formulation for KUR-H and KUR-EH ISM provided in Table 1, and taking into account loss on ignition (LOI), the mass of material that is converted to gas (primarily $CO_2$) rather than entering the glass, a total of 3,550 kg of ISM may be treated in each melt, as shown in Table 3. In some embodiments, each ISM vessel 400 contains approximately 800 kg of IX media 166. Thus, in such embodiments, each melt will process the contents of approximately four ISM vessels 100. Total melt duration, at a processing rate of 150 kg/hr of total feed material (ISM and glass formers) will be approximately 33 hrs.

TABLE 3

| Component | Mass (kg) |
|---|---|
| Kurion H and EH ISM | 3,550 |
| Soda Ash ($NA_2CO_3$) | 467 |
| Lime ($CaCO_3$) | 402 |
| Anhydrous Boric Oxide ($B_2O_3$) | 602 |

On completion of the melt, the ICV container 400 is disconnected from the off-gas treatment system 560 (FIG. 1) and feed system. The ICV container 400 is moved from the melt station to the cooling area 520 (FIG. 1) to allow complete solidification into glass before final transportation to the Interim Storage Facility.

Off-Gas Treatment

Off-gas evolving from ICV plus balance air (for regulating plenum vacuum and temperature in the ICV container 400) constitutes the off-gas routed to off-gas treatment 560 (FIG. 1). IX media melting evolves negligible noxious volatiles requiring abatement (e.g., $NO_x$ or $SO_x$), so the off-gas contaminants of interest are primarily particulate entrainment and volatile Cs. The extent of Cs evolution is dependent on the melter operating temperature. The primary volatile from ISM melting is simply water vapor. Dry IX media such as KUR-H, KUR-EH and UOP IONSIV IE-96 can contain water within the particles (up to 30% moisture content) that is quantitatively evolved during melting which must be managed in the off-gas system 560 (FIG. 1).

In some embodiments the off-gas system 560 (FIG. 1) comprises of the following stages:

Filtration, using at least one of a sintered metal filter and HEPA filter in series and/or in parallel Wet Scrubbing Treated Off-gas Final Conditioning Exhaust Fans and Discharge The off-gas system 560 (FIG. 1) may operate continuously to maintain draft through the drying station and through the ICV container 400 when processing IX media. Air from the drying station may be introduced into the final conditioning stage as it requires only HEPA filtration before discharge.

Sintered Metal Filters

Although airflow through the ICV container plenum is minimized, there can be a small amount of particulate entrainment in the ICV off-gas. Off-gas from the ICV container 400 may be passed through a backpulsable sintered metal filter (SMF). The SMF stage in some embodiments comprises of two filters in parallel. In some embodiments more than two filters are configured in parallel. In some embodiments one or more filters may be included in series. The parallel configuration allows one filter to be taken out of service and the other brought online when recycling collected solids. In some embodiments, the SMF is located with sufficient elevation that particulate is returned to the ICV container 400 by gravity feed. In some embodiments, the SMF is located at a lower elevation with return to the ICV feed hopper by pneumatic transfer. SMFs are rated at 98.3 percent removal efficiency for 0.3 µm particulate. The off-gas entering the SMF may be sufficiently hot that condensation is precluded.

Other filters may be used. Baghouse filters may be used, however, long-term integrity of baghouse filters would be suspect in radioactive application. Additionally, standard High Efficiency Particulate (HEPA) filters may be used. The use of standard HEPA filters as a pre-filter would require physical change-out when the change in pressure approached the filters design pressure drop causing worker exposure issues and additional secondary waste that would have to be processed in the container. A cleanable filter such as the SMFs proposed is a much more efficient approach from a processing standpoint, greatly reduces worker dose and allows for chemical cleaning of the sintered filter in place and remotely.

Wet Scrubbing

The off-gas exiting the SMF may be high temperature. The off-gas may be contacted with recirculating working fluid in tandem venturi scrubbers. The venturi scrubbers may be mounted directly on a scrub tank. The tank may be equipped with an internal baffle to ensure that air flows through both venturi scrubbers in series. The function of the scrubbers is to condense volatile cesium, and remove fine particulate that penetrates the SMF. In some embodiments, varying amounts of scrubbers may be used in different configurations including parallel and in series.

In some embodiments, treated air exiting the scrub tank is saturated with water vapor and entrains water droplets, thus the exiting air passes through a filter, which may be a High Efficiency Mist Eliminator (HEME). As contaminated working fluid from the venturi scrubbers collects in the scrub tank, it may circulate through an external loop to be processed through one or more filters to remove particulate, through selective ion exchange to remove soluble cesium, and through a cooler (as needed) before it is introduced at the venturi scrubber. Periodically spent filters and ISM may be transferred to the in-preparation ICV container 400 to be included in a subsequent melter run. Periodically, spent working fluid may be pumped out to an operating melter. Soluble components are retained in the melt and water is evaporated to be released through the off-gas treatment system 560 (FIG. 1).

The air passing through the scrubber system may become saturated with water, thus water accumulation can be regulated by adjusting the operating temperature. The ideal operating temperature of the wet scrubber system is the temperature that prevents net accumulation of water. There is a primary cooling effect in the venturi scrubbers as the passing air saturates with water vapor. Additional cooling of the circulating working fluid (as needed) can be applied in the external loop. The working fluid of the wet scrubbing system can become acidic over time from the capture of acidic gases depending on the waste types being processed. Thus, the scrubbing system may include a caustic storage tank and pH adjustment tank to automatically regulate the pH of the working fluid.

Treated Off-Gas Final Conditioning

Treated off-gas exiting wet scrubbing may be saturated with water vapor. In final conditioning, the treated off-gas may be heated (nominally 15° C. in some embodiments) to reduce relative humidity prior to final filtration. Final conditioning of the off-gas before discharge may be by HEPA filtration, though other filtration methods are possible. HEGA filtration in addition to HEPA filtration for removal of organic carbon and radioiodine may be utilized in some embodiments.

In some embodiments there are two parallel HEPA filter trains: one train normally operating and one on standby. The specific design of the HEPA could include any or all of the following components: regulating butterfly valve, round-to-rectangular transition (as needed), inlet test section, HEPA filter banks (in series as needed with combination test sections), outlet test sections, and rectangular-to-round transition (as needed). In some embodiments more or fewer filters may be incorporated. In some embodiments, one or more other filter types may be used.

In some embodiments, the HEPA filters are equipped for condensate collection consisting of condensate drain lines from the respective filter sections, collection sump, condensate removal pump, and collection tank. Periodically, spent HEPAs are transferred to the in-preparation ICV container 400 to be included in the next melter run.

Exhaust Fans and Discharge

In some embodiments there are one or more exhaust fans. In some embodiments there may be two or more exhaust fans configured in parallel and/or in series. In some embodiments, two exhaust fans are configured in parallel. One fan may operate continuously and the other may be on standby. The exhaust fans provide the motive force to move exhaust gases and vapors through the off-gas train, while maintaining the required vacuum in the ICV container 400. Variable frequency drives may be used to control fan speed. The exhaust stack may be designed to disperse treated gases to the atmosphere in compliance with local regulations. The exhaust stack may be equipped for flow monitoring, and may be equipped with all sample probes and devices required for stack gas analysis, data collection, and regulatory reporting. Stack monitoring may comprise one or more of the following:

Off-gas stack flow measurement
Off-gas stack temperature measurement
Continuous radiation monitor
Record sampler
Particulate monitor
Other capabilities may be included as needed and per the regulatory requirements.

Cooling of ICV Container

Figure 13:
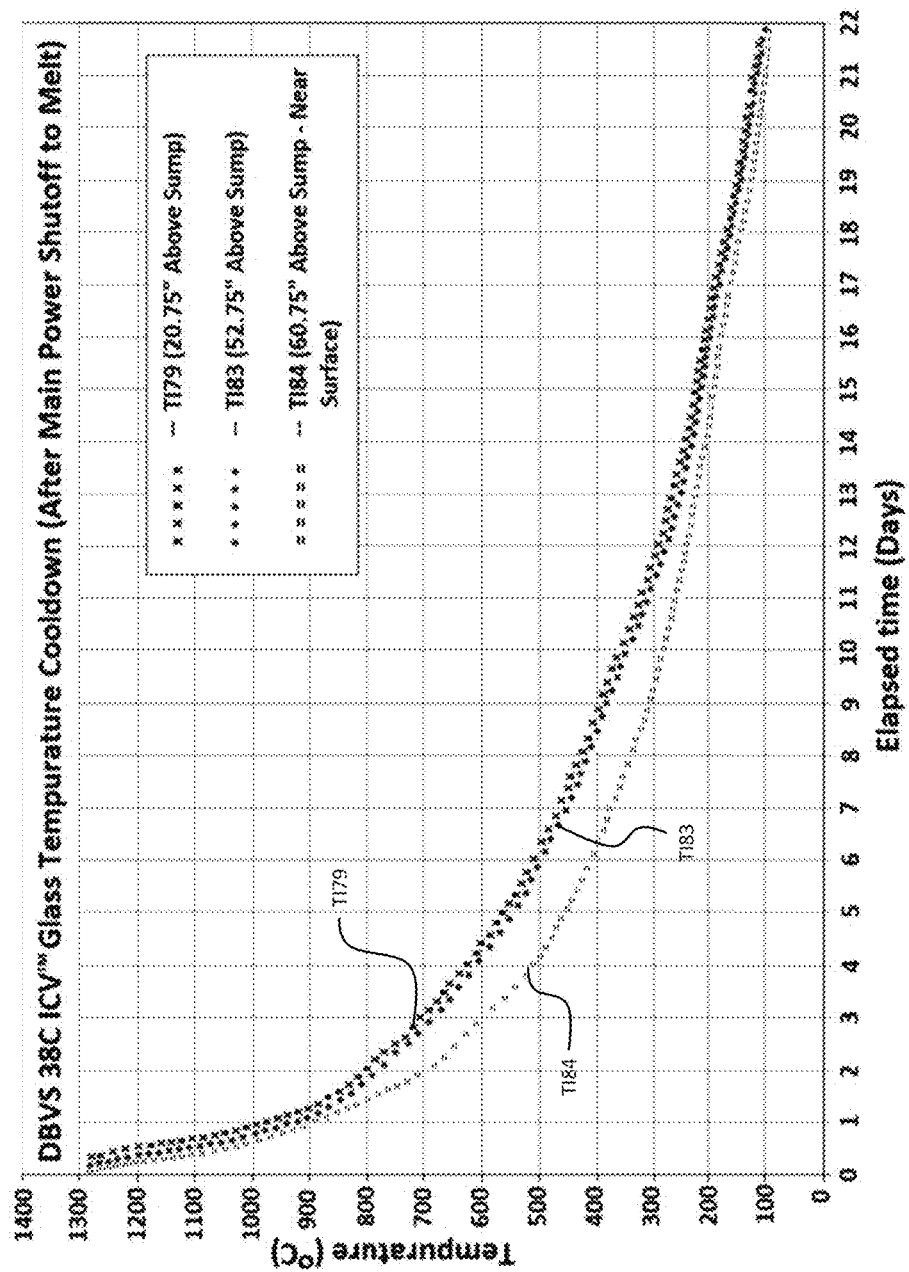
FIG. 13 depicts the glass cooling curve for a 50-tonne melt.

Cooling of the ICV container 400 may take place in the ICV cooling area 520 (FIG. 1). Cooling of the molten glass may take place within the processing duration of subsequent melts so that there is no accumulation of finished melts in the Geomelt Treatment Facility 1 (FIG. 1). Referring to FIG. 13, based on cooling data for a much larger ICV system than that described herein, each ICV container 400 may cool to 700° C. within two days. At 700° C., the glass will be solid, therefore eliminating any accident scenario involving molten glass exiting the ICV container 400 while being loaded or transported to an Interim Storage Facility.

Physical Properties of the Glass

Glass is the preferred waste form for high-level radioactive waste and has been used extensively to immobilize radionuclides from the environment in France, Germany, Belgium, Russia, United Kingdom, Japan, and the USA. Glass is chemically stable in terms of leachability, durability, and corrosion, as defined by several standard test methodologies, described below:

The Vapor Hydration Test (VHT) procedure is a static (i.e., unagitated) test involving a monolithic glass sample suspended in deionized waster at 200° C., usually for 28 days. Corrosion rates are obtained by measuring glass thickness before and after the test. Test results are typically compared to a reference standard glass that is used as an industry accepted standard of performance.

The Materials Characterization Center-1 is a static leach test that measures the elemental mass loss of a monolith sample of glass as a function of time. Corrosion rates are obtained by analysis for elements from the glass that leached into the water. The sample is monolithic, suspended in deionized water inside of a sealed container and maintained at 90° C. for the test period, usually 28 days.

The Product Consistency Test (PCT) procedure is similar to the MCC-1 except the sample is pulverized and agitated. The PCT is designed to require a shorter time period than the MCC-1 test and still be able to demonstrate product quality and composition. As with VHT, test results are typically compared to a reference standard glass that is used as an industry accepted standard of performance.

Figure 14:
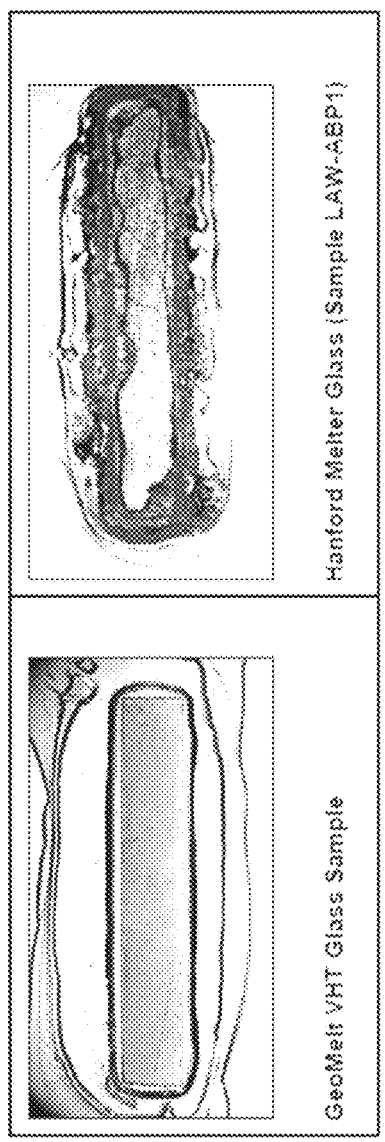
FIG. 14 depicts vapor hydration test results for GeoMelt vitrified product versus Hanford baseline melter glass.

A comparison of the chemical durability of a GeoMelt glass and a reference glass used as the baseline for the U.S. Department of Energy's Hanford Site (located in the United States) is depicted in FIG. 14. After the same VHT test procedure, the GeoMelt glass shows no visible corrosion, but the reference glass shows significant corrosion. Additional VHT and PCT test results are provided in Table 4, below, which shows that GeoMelt glass from several previous projects exceeds waste acceptance criteria and generally performs better than the standard reference waste glass used by the DOE for Hanford Site waste glasses.

TABLE 4

| Glass Type | | PCT | VHT | Reference |
|---|---|---|---|---|
| U.S. Waste Acceptance Criteria | | <2.0 g/m$^2$ | <50 g/(m$^2$*day) | |
| Hanford ILAW Reference Waste Glass LAW-ABP1 | | Na = 0.38<br>Si = N/A<br>B = 0.34 | 4.4 | PNNL, 2000 |
| GeoMelt Glass | Bulk Vitrification Project ES-1-ICV (2003) | Na = 0.1434<br>Si = 0.625<br>B = 0.353 | 0.78 | AMEC, 2003 |
| | Hanford DBVS Project 38-D ICV (2007) | Na = 0.256<br>Si = 0.104<br>B = 0.166 | 0.29 | AMEC, 2007 |
| | Sellafield Project (2011) | Na = 0.109<br>Si = 0.121<br>B = 0.321 | N/A | IMPACT, 2012 |
| | MVS Scoping Tests (2013) | Na = 0.84<br>Si = 0.25<br>B = 0.15 | N/A | Kurion, 2013 |

Table 5, below, compares GeoMelt glass samples with standard specifications of high-level vitrified waste produced by JNFL and JAEA. The MCC-1 values for the JNFL and JAEA glass is given as Bulk Leach Rate (BLR, or total mass of all elements released), and are not directly comparable to PCT test results given above in Table 4. Table 5 compares JNFL (Rokkasho) and JAEA specifications with GeoMelt glass MCC-1 results. Note that the GeoMelt glass sample was subjected to an extended MCC-1 test duration (1557 days), and the results indicate that the dissolution rate from GeoMelt glass decreases with time. Bulk MCC-1 leach rates of the GeoMelt example given in Table 5 are comparable or lower than the JNFL and JAEA specifications.

TABLE 5

| MCC-1 Bulk Leach Rate Results (kg/m$^2$/day) | | | | |
|---|---|---|---|---|
| JNFL-Rokkasho (28 days) | JAEA-Tokai (28 days) | GeoMelt (28 days) | GeoMelt (180 days) | GeoMelt (1557 days) |
| 0.002 | 0.005 | 0.0028<br>(Pu = 0.000252) | 0.00025<br>(Pu = 0.0001034) | 0.00002<br>(Pu = 0.00000006) |

In the case of IX media used to capture radionuclides, the chemical composition of the media is typically well known and consistent which provides a uniform feed stream from a glass former standpoint; however, the concentration of the radionuclides loaded onto the media in an ISM vessel can vary to some degree both vertically and radially within the ISM vessel. When the loaded media is removed from the ISM vessel and transported using conventional material handling mechanisms such as with the pneumatic system proposed herein to transfer the waste feed to the ICV container loading mechanism, mixing of the media occurs which serves to distribute and further mix the radionuclide inventory thereby providing a more uniform feed prior to vitrification.

Once fed to one of the GeoMelt Treatment Facilities 1 (FIG. 1), homogeneity of the resulting glass product has been consistently demonstrated. Homogeneity is typically enhanced during vitrification due to convective currents that are formed within the melt environment. These convective currents induce a flow and mixing within the molten waste that is highly effective in uniformly distributing both contaminant species and glass forming minerals to produce a consistently homogeneous and durable final product. The benefits of a homogenous waste form are many and include the following:

Leach Resistance—A homogenous waste form ensures that results from leach resistance testing are representative of the entire waste form. Additionally, a homogenous waste form ensures the accuracy of the output of long-term waste form modeling while also ensuring optimum long-term leach resistance performance of the vitrified product.

Characterization Effort—A homogenous vitrified waste form created via GeoMelt vitrification processes serves to significantly decrease the level of effort and costs required to accurately characterize the entire waste form.

Dose Reduction—The vitrified waste form provides a significant level of self-shielding due to its high density. By evenly distributing radioactive contaminants throughout the vitrified waste form, dose to the surrounding is minimized as activity emitted from radionuclides in the central region of the waste from is effectively shielded.

Criticality Protection—If transuranic radionuclides such as plutonium and uranium are contained in the waste being treated, they are effectively oxidized within the melts and due to convective mixing that occur are effectively mixed throughout the glass. This uniform mixing prevents any concentrating or accumulating effects from occurring wherein a criticality could occur.

To demonstrate the ability to provide a homogenous waste form, samples of the glass are collected both during the melting process and/or after the melt has cooled that allow for sample analysis to occur which can then be used to show homogeneity as well as other sample data of interest. The post melt sampling has proven to be very flexible and effective as an entire core sample of the treatment container can be collected either vertically or horizontally to provide representative samples of the vitrified product available from any location in the ICV container. Based on an unbiased sampling approach, glass samples from select intervals of the cores may be taken and submitted for appropriate analytical analysis (such as β/γ counting, ICP-MS, or XRF).

GeoMelt ICV glass is typically 5 to 10 times stronger than concrete in both tensile and compressive strengths. This strength is a benefit that helps minimize the potential for human and animal intrusion. Although the vitrified product is strong, it can be broken into manageable pieces and handled with conventional heavy equipment. Table 6 shows the strength and other advantages of GeoMelt glass compared to concrete.

TABLE 6

| Physical Property | GeoMelt Glass | Grout/Concrete |
|---|---|---|
| Chemical Durability (years) | $<10^4$-$10^6$ | $10^2$ |
| Waste Loading | Generally Higher | Limited |
| Compressive Strength (psi) | 40,000-60,000 | 3,000-8,000 |
| Tensile Strength (psi) | 4,000-4,400 | 400-600 |
| Final Volume | Decrease | Increase |

Solubility of Sulfur in the Glass

The inclusion of sulfur in to the waste glass, typically as $SO_x$, an inclusive term referring to $SO_2$ and $SO_3$, can be problematical for waste glass melters. The solubility of sulfur oxides in most glass formulations has been reported up to a weight percent of 2.05 as $SO_3$. Exceeding this solubility limit can result in the formation of sulfur salts. These sulfur salts can then segregate and accumulate as a separate phase appearing as a yellowish layer at the top of the melter. This layer of molten ionic salts (MIS) is very corrosive and can cause damage to electrodes, other components of a melter, and the refractory linings of the melters themselves. Additionally, the formation of sulfur salts can increase the volatility of radionuclides such as cesium. Such occurrences are known to be problematic with conventional joule-heated melters. These melters are continuously fed and discharge from midlevel or the bottom of the melt chamber. This allows amounts of sulfur to accumulate over time on the surface, even if the feed has initially low sulfur content. Since they discharge from below the surface of the melt and the sulfur salts accumulate at the top, the salts are never allowed to discharge. The GeoMelt ICV melter is, in contrast, a batch operation where the melt and disposal vessels are one and the same. Provided that the raw feed does not exceed the sulfur limits imposed by the glass formulation there is not an opportunity for a sufficient amount of sulfur salts to accumulate to the point of being problematic. Much work on chemical modification to the waste feed stream has been done such as the demonstration of adding barium to increase sulfur solubility.

The addition of barium may increase the molten pool viscosity into a range where conventional melters cannot operate due to their inability to pour or drain their melters. The GeoMelt ICV process described herein is a batch process thus it does not require a pouring of glass. As a batch process it is capable of accommodating such formulation modifications as means to increase the sulfate loading. The primary waste streams targeted for this concept do not contain sulfur in concentrations exceeding the glass solubility limit so it is unlikely there will be any sulfur-related difficulties.

Interim Storage of ICV Container

Each completed ICV container 400 (FIG. 3) may be returned to the Interim Storage Facility. Alternatively, each completed ICV container 400 (FIG. 3) may be moved to a permanent storage facility. In some embodiments, the ICV container 400 (FIG. 3) is sized such that four containers fit into each culvert 600 as depicted in FIG. 4. In some embodiments, each culvert 600 may contain the contents of sixteen ISM vessels 100.

Waste Package Radioactive Decay Heat

Thermal calculations have been performed to establish bounding values for temperature in the vitrified waste and in the concrete wall of the interim storage culvert resulting from radioactive decay. A Computer Aided Design software configured for Finite Element Analysis, such as an ANSYS model, has been developed and initial results reported. These preliminary results indicate that the terminal temperature in the center of the glass will be about 200° C. and temperature rise in the concrete vault will be very small. These results seem reasonable for the thermal loading of 900 watts per ICV container. These temperatures will not cause unfavorable impacts on either the glass or the concrete.

Waste Package Dose Calculations

Calculations using Microshield were performed to establish dose rates predicted for ICV containers. Various container configurations were reevaluated. The current round of calculations was reconciled with those done earlier. Higher dose rates for the current round of calculations are expected because the earlier calculations assumed all the Cs was Cs-137 and current calculations include a contribution from Cs-134. Though Cs-137 dominates the curie content of the waste, the high energy of the Cs-134 gamma makes the Cs-134 contribution to the dose rates significant.

Figure 15:
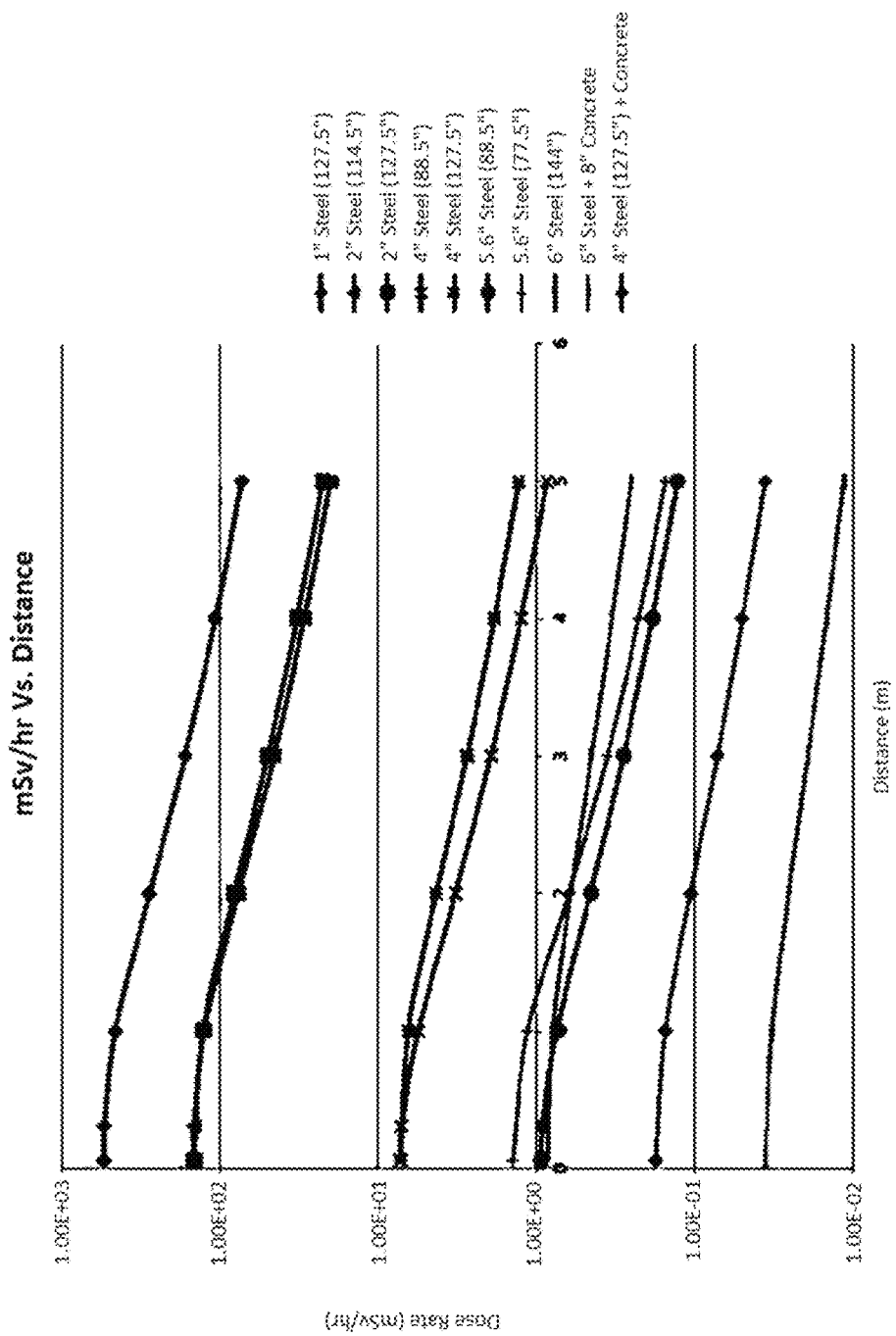
FIG. 15 depicts waste package dose rates.

Calculations were made for containers with varying thicknesses of steel shielding from 1 inch (25 mm) up to 5.6 inches (142 mm). Results of these calculations are shown in FIG. 15. For a fully loaded ICV container, 142 mm of steel shielding is required to bring the dose rate on contact with the container wall down to the site objective dose limit of 1 mSv/hr. For a container with 4 inches (101 mm) of steel shielding, dose rates are predicted to be about 7 mSv/hr on contact and falling to near 1 mSv/hr at a distance of 4 meters.

Power Requirements

The GeoMelt ICV process may employ a power system which allows for variable power levels to the melt environment and variable voltage levels to be able to accommodate changes in melt resistance due to different waste properties and changes in the size of the melt. The power system may be divided into two main areas: 1) the power supply to the melt which provides the power for the melting process (which may be joule-heated in some embodiments), and 2) ancillary power to the balance of the system for such items as off-gas components (fans, pumps, heaters), instrumentation, heating and air conditioning (HVAC), lighting, and other low voltage needs such as for process control and data acquisition and facility needs.

The power supply system to the melt may employ a 600 kVA Scott-Tee connected transformer in some embodiments that produces variable voltage output through a range of operator selectable voltage taps. Power output is controlled at the primary side of the transformer with silicon control rectifier (SCR) technology, which uses a single potentiometer selectable for either voltage or current control. The Scott-Tee transformer is a system to convert primary 3-phase power (three-wire) to two secondary phases.

Transformers typically have several separate voltage tap settings ranging from >1000 volts to <150 volts. The voltage taps have corresponding increasing current ratings of similar amps per phase (150 A to >1000 Amps, respectively). The power supply to the other ancillary equipment such as the off-gas system, HVAC, lighting, pneumatic system, facility, etc. may typically be on the order of 150-200 KVA and may be designed to transform incoming power into voltages and frequencies applicable to the levels required for the equipment such as that designed for eastern Japan.

The entire GeoMelt facility, including both vitrification power and auxiliary equipment power, requires 850 kVA in some embodiments and can be designed to accept any standard incoming utility grid power level. A backup diesel generator may be utilized to provide energy for the operation of all essential equipment for personnel and environmental safety in the event that utility line power is interrupted. These include the off-gas system, data acquisition system, environmental and system monitoring equipment, heating and air conditioning, and system lighting. Activation of the generator is automatic upon the loss of utility line power, thus providing uninterrupted power to essential process equipment. Additionally, if the availability of grid power is limited due to remoteness or limited capacity, the entire power system can be designed to be supplied by a combustion-based generated power system. Additionally, power generation may be augmented by one or more alternative methods such as solar and wind power.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the systems, methods, processes, and/or apparatuses disclosed herein in a preferred embodiment thereof, it should be apparent that the systems, methods, processes, and/or apparatuses may be modified in arrangement and detail without departing from such principles. Claim is made to all modifications and variation coming within the spirit and scope of the following claims.

The invention claimed is:

1. A system for processing spent ion exchange media, comprising:
    an ion exchange vessel wherein the ion exchange vessel contains spent ion exchange media;
    a drying system including an opening in the ion exchange vessel to receive heated air for drying the spent ion exchange media;
    a removal system including a vacuum tool for removing the dried spent ion exchange media from the ion exchange vessel;
    a blending system including a hopper for blending the dried spent ion exchange media with additives;
    a vitrification system including electrodes for vitrifying the blended ion exchange media and additives in a vitrification container yielding vitrified product with embedded contaminants; and
    a sluice system to inject water into the ion exchange vessel and pump out a sludge resulting from a mixture of the water and the ion exchange media, wherein the sluice system includes:
        a centrifuge to remove bulk water from the sludge and yield a dewatered effluent;
        an auger to transport the dewatered effluent into a hopper; and
        a heater to heat the dewatered effluent while transported by the auger.

2. The system of claim 1, wherein the vitrification containers include a refractory lining extending inside of the bottom and side wall.

3. The system of claim 1, further comprising a conveyer configured to transport the vitrification containers from a vitrification processing area to a cooling area.

4. The system of claim 1, wherein the removal system comprises pressurized air jets.

5. The system of claim 1, wherein the additives are glass formers.

6. The system of claim 1, wherein one or more of the drying system, removal system, blending system, and vitrification system are performed on or within mobile skids.

7. The system of claim 1, wherein one or more of the drying system, removal system, blending system, and vitrification system are performed within a single structure.

8. A method for processing spent ion exchange media, comprising:
    drying spent ion exchange media contained in an ion exchange vessel;
    removing the dried spent ion exchange media from the ion exchange vessel;
    blending the dried spent ion exchange media with additives;
    vitrifying the blended ion exchange media and additives in a vitrification container producing vitrified ion exchange media with embedded contaminants;
    wherein removing the dried spend ion exchange media comprises:
        injecting water into the ion exchange vessel;
        pumping a sludge out of the ion exchange vessel resulting from a mixture of the water and the ion exchange media;
        removing bulk water from the sludge with a centrifuge to yield a dewatered effluent;
        recycling the bulk water back into the ion exchange vessel with the water;
        transporting the dewatered effluent with an auger into a hopper; and
        heating the dewatered effluent transported in the auger.

9. The method of claim 8, further comprising treating off-gasses released by one or more of the drying, removal, blending, and vitrification.

10. The method of claim 8, wherein the ion exchange media is dried using heated dry air.

11. The method of claim 8, wherein the ion exchange media is dried using pressurized air jets.

12. The method of claim 8, further comprising:
    inserting a round pneumatic suction tube down into a top end of the ion exchange vessel;
    blowing air out of pneumatic jets located on a first bottom side of the suction tube causing the ion exchange media to circulate inside of the ion exchange vessel; and
    sucking up the circulated ion exchange media through inlets located on a second opposite bottom side of the suction tube.

13. The method of claim 8, wherein the vitrified ion exchange media with embedded contaminants is homogenous.

14. The method of claim 8, wherein a volume of the vitrified ion exchange media with embedded contaminants is reduced from a volume of the spent ion exchange media.

15. The method of claim 8, wherein one or more of the drying, removal, blending, and vitrification are performed on or within mobile skids.

16. The method of claim 8, wherein one or more of the drying, removal, blending, and vitrification are performed within a single structure.

17. A system for processing spent ion exchange media, comprising:
    an ion exchange vessel wherein the ion exchange vessel contains spent ion exchange media;

a drying system including an opening in the ion exchange vessel to receive heated air for drying the spent ion exchange media;

a removal system including a vacuum tool for removing the dried spent ion exchange media from the ion exchange vessel;

a blending system including a hopper for blending the dried spent ion exchange media with additives; and a vitrification system including electrodes for vitrifying the blended ion exchange media and additives in a vitrification container yielding vitrified product with embedded contaminants, wherein the removal system comprises:

a round pneumatic suction tube configured to insert down into a top end of the ion exchange vessel;

a round suction head located on a bottom end of the tube;

inlets located on a first side of the suction head for removing the ion exchange media from the ion exchange vessel; and pneumatic jets located on a second opposite side of the suction head configured to cut and circulate the ion exchange media inside of the ion exchange vessel and promote suction of ion exchange media up into the inlets.

* * * * *